US011896136B2

(12) United States Patent
Brandt et al.

(10) Patent No.: US 11,896,136 B2
(45) Date of Patent: Feb. 13, 2024

(54) PNEUMATIC HAPTIC DEVICE HAVING ACTUATION CELLS FOR PRODUCING A HAPTIC OUTPUT OVER A BED MATTRESS

(71) Applicant: Apple Inc., Cupertino, CA (US)

(72) Inventors: Riley E. Brandt, Menlo Park, CA (US); Linda Benavente-Notaro, Cupertino, CA (US); Antonio Herrera, Woodside, CA (US); Denis Lin, Stanford, CA (US); Zijing Zeng, Santa Clara, CA (US); Erno H. Klaassen, Los Altos, CA (US); Zhipeng Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 17/020,585

(22) Filed: Sep. 14, 2020

(65) Prior Publication Data

US 2021/0085091 A1 Mar. 25, 2021

Related U.S. Application Data

(60) Provisional application No. 62/902,811, filed on Sep. 19, 2019.

(51) Int. Cl.

*A47C 27/08* (2006.01)
*G08B 6/00* (2006.01)

(Continued)

(52) U.S. Cl.

CPC ............ *A47C 27/083* (2013.01); *A47C 27/10* (2013.01); *A47C 27/146* (2013.01); *A47C 27/18* (2013.01); *G08B 1/04* (2013.01); *G08B 6/00* (2013.01)

(58) Field of Classification Search

CPC ..... A47C 27/083; A47C 27/10; A47C 27/146; A47C 27/18; A47C 31/123; A47C 27/082;

(Continued)

(56) References Cited

U.S. PATENT DOCUMENTS 3,209,380 A * 10/1965 Watsky ................ A47C 27/144 297/452.47
3,613,671 A * 10/1971 Poor ...................... B60N 2/976 601/149

(Continued)

FOREIGN PATENT DOCUMENTS

CN 111061944 4/2020
CN 213182667 5/2021

(Continued)

OTHER PUBLICATIONS

U.S. Appl. No. 17/871,605, filed Jul. 22, 2022, Brandt et al.

(Continued)

*Primary Examiner* — Myles A Throop
(74) *Attorney, Agent, or Firm* — Brownstein Hyatt Farber Schreck, LLP

(57) ABSTRACT

An in-bed haptic device may include an array of actuation cells. Actuation cells of the array of actuation cells may be configured to actuate (e.g., expand, contract, or otherwise change shape) in a predetermined sequence to provide haptic outputs. The in-bed haptic device may be configured to be placed beneath a user during use, for example between a user and a mattress. The haptic outputs may be provided to help a user relax, to move and/or wake a user, to indicate outputs, alerts, or notifications at the in-bed haptic device or another electronic device, or the like.

21 Claims, 26 Drawing Sheets

(51) Int. Cl.
*A47C 27/14* (2006.01)
*A47C 27/10* (2006.01)
*A47C 27/18* (2006.01)
*G08B 1/04* (2006.01)

(58) Field of Classification Search
CPC ........ A47C 27/088; A47C 27/16; G08B 1/04; G08B 6/00; B60N 2/914; F25B 39/022; G06F 1/163; G06F 3/016; F15B 11/028
See application file for complete search history.

(56) References Cited

U.S. PATENT DOCUMENTS 4,267,611 A * 5/1981 Agulnick ........... A61G 7/05776 5/691
4,827,763 A 5/1989 Bourland et al.
5,389,848 A 2/1995 Trzaskos
5,619,764 A * 4/1997 Lopau ................ A61G 7/05776 5/713
5,638,565 A * 6/1997 Pekar ................... B65D 81/052 5/710
5,647,078 A * 7/1997 Pekar .................... B29C 66/723 5/710
5,651,151 A * 7/1997 Schild ................ A61G 7/05776 5/713
6,353,207 B1 * 3/2002 Burt ......................... B60N 2/56 219/217
6,415,467 B1 * 7/2002 Bretvin ............. A61G 7/05769 5/713
6,679,315 B2 * 1/2004 Cosley ................. H05K 1/0203 257/E23.098
7,325,455 B2 2/2008 Campbell et al.
7,395,717 B2 7/2008 DeAngelis et al.
7,492,241 B2 2/2009 Piazza et al.
7,500,536 B2 3/2009 Bulgajewski et al.
7,578,195 B2 8/2009 DeAngelis et al.
7,656,673 B1 2/2010 Fries et al.
8,169,124 B2 5/2012 Lee et al.
8,258,675 B2 9/2012 Ikehara et al.
8,341,786 B2 * 1/2013 Oexman .............. A47C 31/123 5/713
8,426,933 B2 4/2013 Yacoubian
8,540,644 B2 9/2013 Husheer
8,598,893 B2 12/2013 Camus
8,771,204 B2 7/2014 Telfort et al.
8,917,167 B1 12/2014 Selker
8,961,904 B2 * 2/2015 Xia ................... B01L 3/502776 422/68.1
8,979,766 B2 3/2015 Sullivan
9,131,039 B2 9/2015 Behles
9,271,665 B2 3/2016 Sarrafzadeh et al.
9,278,629 B2 3/2016 Stanley et al.
9,504,416 B2 * 11/2016 Young ...................... A61B 5/18
9,591,995 B2 * 3/2017 Blumberg .............. A47C 17/62
9,723,719 B2 8/2017 DeRosa et al.
9,733,136 B2 8/2017 Seitz
9,848,494 B2 12/2017 Huitema et al.
9,848,712 B2 12/2017 Main et al.
9,857,930 B2 1/2018 Sebastian et al.
10,180,721 B2 1/2019 Hoen et al.
10,278,638 B2 5/2019 Dusanter et al.
10,349,895 B2 7/2019 Telfort et al.
10,418,933 B2 9/2019 France et al.
10,463,340 B2 11/2019 Telfort et al.
10,653,332 B2 5/2020 McGrane et al.
10,763,421 B2 9/2020 Benedict et al.
10,925,573 B2 2/2021 Martin et al.
11,020,298 B2 * 6/2021 Brykalski ............ A47C 21/044
11,105,025 B2 8/2021 Boylu et al.
11,191,486 B2 12/2021 Griffin et al.
11,219,397 B2 1/2022 Wang et al.
11,462,673 B2 10/2022 Yoshida et al.
11,679,047 B2 * 6/2023 Wijesundara ...... A61G 7/05776 5/713
2001/0020303 A1 * 9/2001 Endo ......................... A61F 7/00 5/421
2002/0066143 A1 * 6/2002 Graebe .............. A61G 7/05769 5/713
2002/0133877 A1 * 9/2002 Kuiper ................. A61G 7/1021 5/81.1 R
2003/0213580 A1 * 11/2003 Philpott ................ F28F 21/065 29/890.032
2004/0045090 A1 * 3/2004 Tsai ................... A61G 7/05707 5/709
2004/0177622 A1 * 9/2004 Harvie ................. B60N 2/5685 62/3.3
2005/0257822 A1 11/2005 Smith et al.
2009/0093687 A1 4/2009 Telfort et al.
2011/0010014 A1 * 1/2011 Oexman .................. F24F 11/63 600/301
2011/0107521 A1 * 5/2011 Alder ................... A47C 27/081 5/706
2011/0296621 A1 * 12/2011 McKenna .......... A61G 7/05776 5/713
2012/0079662 A1 * 4/2012 Dzioba .................. A47C 27/10 5/713
2012/0242492 A1 9/2012 Grunfeld
2012/0313420 A1 * 12/2012 Beyerlein ................ B60N 2/64 297/452.41
2015/0137994 A1 * 5/2015 Rahman ................... H04Q 9/04 340/870.07
2015/0164409 A1 6/2015 Benson et al.
2015/0199919 A1 * 7/2015 Ander ...................... G08B 7/00 340/4.12
2016/0229320 A1 * 8/2016 Lem ....................... B60N 2/976
2016/0317370 A1 * 11/2016 Evans .................... G05B 15/02
2016/0370210 A1 12/2016 Kapusta et al.
2017/0056644 A1 3/2017 Chahine et al.
2018/0035982 A1 2/2018 Tholen et al.
2018/0254403 A1 9/2018 Jeong et al.
2019/0109904 A1 4/2019 Binder et al.
2019/0117165 A1 4/2019 Zeng et al.
2019/0187794 A1 6/2019 Khoshkava
2020/0000441 A1 1/2020 Lafon et al.
2020/0229320 A1 * 7/2020 Mou .................. H05K 7/20145
2021/0038092 A1 2/2021 Amin et al.
2021/0041287 A1 * 2/2021 Rimminen ............. G01H 11/08
2021/0085091 A1 3/2021 Brandt et al.
2021/0295661 A1 * 9/2021 Tadele ................. A61B 5/6892
2021/0307527 A1 * 10/2021 Grutta .................. A47C 27/146
2022/0047250 A1 2/2022 Clements et al.
2022/0061699 A1 3/2022 LaBove et al.
2022/0409095 A1 12/2022 Chuo et al.

FOREIGN PATENT DOCUMENTS

JP H08131408 5/1996
JP 2003164527 6/2003
JP 2006230790 9/2006
JP 2008264352 11/2008
JP 2010502338 1/2010
JP 2014212977 11/2014
JP 2019051069 4/2019
KR 101841365 B1 * 3/2018 ............. G06F 3/016
KR 20180079957 7/2018
KR 102087286 B1 * 4/2020 ............. G06F 1/163
WO WO 14/067777 5/2014
WO WO 16/019087 2/2016
WO WO 17/190085 11/2017
WO WO 18/023135 2/2018
WO WO 20/073091 4/2020
WO WO 21/087326 5/2021

OTHER PUBLICATIONS

U.S. Appl. No. 16/929,731, filed Jul. 15, 2020, Amin et al.
U.S. Appl. No. 16/930,125, filed Jul. 15, 2020, Rimminen et al.
U.S. Appl. No. 16/991,815, filed Aug. 12, 2020, Clements et al.
U.S. Appl. No. 17/008,240, filed Aug. 31, 2020, LaBove et al.

(56) References Cited

OTHER PUBLICATIONS

Robertson et al., "A Compact Modular Soft Surface with Reconfigurable Shape and Stiffness," IEEE/ASME Transactions on Mechatronics, vol. 24, No. 1, Feb. 2019, pp. 16-24.
U.S. Appl. No. 17/339,738, filed Jun. 4, 2021, Tadele et al.
U.S. Appl. No. 17/355,442, filed Jun. 23, 2021, Chuo et al.

* cited by examiner

PNEUMATIC HAPTIC DEVICE HAVING ACTUATION CELLS FOR PRODUCING A HAPTIC OUTPUT OVER A BED MATTRESS

This application is a nonprovisional of and claims the benefit under 35 U.S.C. § 119(e) of U.S. Provisional Patent Application No. 62/902,811, filed Sep. 19, 2019, the contents of which are incorporated herein by reference as if fully disclosed herein.

FIELD

Field

The described embodiments relate generally to a devices and systems for providing haptic outputs. More particularly, the described embodiments relate to an in-bed haptic device having actuation cells and a control system configured to introduce pressurized air (or another fluid) into the actuation cells to provide haptic outputs.

Background

Electronic devices may have one or more output mechanisms that provide tactile outputs to a user of the device. In general, it may be beneficial for electronic devices to provide tactile outputs to users while they are in bed. Some traditional electronic devices may provide tactile feedback to users in bed, but the types of tactile feedback that can be provided are limited and devices can cause discomfort to users. The systems and techniques described herein overcome some of these limitations with traditional electronic devices by providing haptic or tactile feedback using an in-bed haptic device.

SUMMARY

Embodiments of the systems, devices, methods, and apparatuses described in the present disclosure are directed to an in-bed haptic device having actuation cells and a control system configured to introduce pressurized air into the actuation cells to provide haptic outputs.

Embodiments described herein may include an in-bed haptic device that includes an array of actuation cells and one or more passage members. Each actuation cell of the array of actuation cells may be configured to actuate in response to a fluid being introduced into the actuation cell. The one or more passage members may be positioned beneath the array of actuation cells and may define one or more passages configured to fluidly couple the array of actuation cells to a control system. The control system may be configured to introduce pressurized air into individual cells of the array of actuation cells in a predetermined sequence to provide a haptic output.

Embodiments described herein may further include an in-bed haptic device that includes a top layer defining a top external surface, a bottom layer defining a bottom external surface, and an array of actuation cells positioned between the top layer and the bottom layer. The in-bed haptic device may further include a set of passages between the top layer and the bottom layer. Each passage may fluidly couple a respective actuation cell of the array of actuation cells to a control system. The array of actuation cells may be configured to locally deform the top layer to provide a haptic output.

Embodiments described herein may further include a system for providing haptic outputs that includes an in-bed haptic device and a control system. The in-bed haptic device may include an array of actuation cells. Each actuation cell of the array of actuation cells may be configured to inflate. The control system may include a reservoir configured to contain a fluid, a pump configured to pressurize the fluid contained in the reservoir, a valve array configured to fluidly couple the reservoir to the array of actuation cells, and a processing unit configured to control the valve array to inflate individual actuation cells of the array of actuation cells in a predetermined sequence using the pressurized fluid to provide a haptic output.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
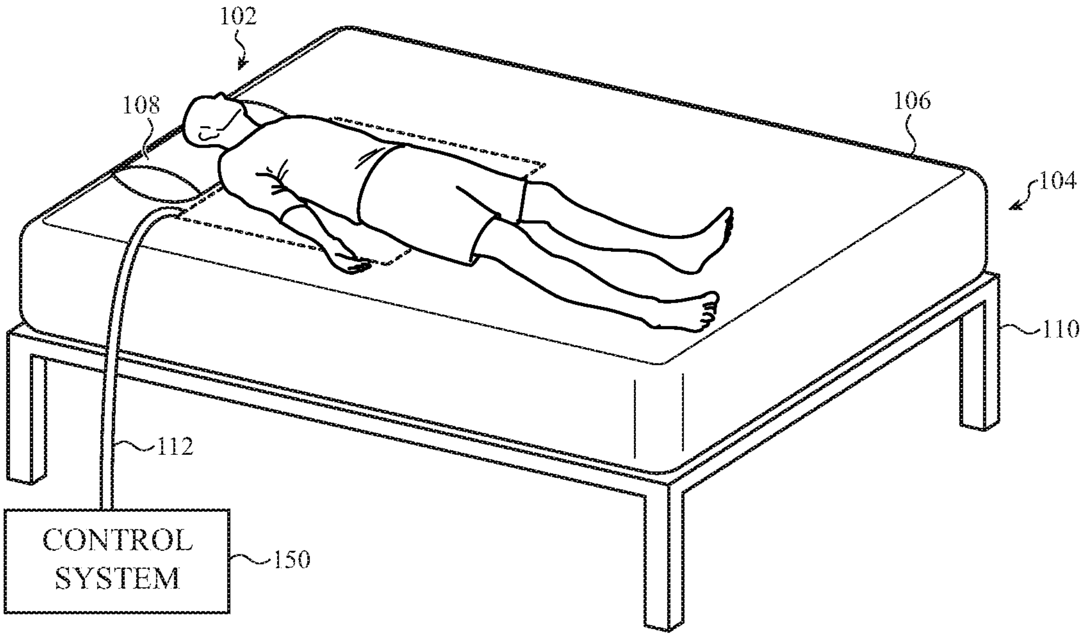
FIG. 1 shows an example environment for using an in-bed haptic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to a system for providing haptic outputs. The system may include an in-bed haptic device having an array of actuation cells. Actuation cells of the array of actuation cells may be configured to actuate (e.g., expand, contract, or otherwise change shape) in a predetermined sequence to provide haptic outputs. The haptic outputs may be provided in response to detected inputs at the in-bed haptic device or another electronic device, or in association with notifications, alerts, or other outputs at the in-bed haptic device or another electronic device.

As used herein, the term "haptic output" may be used to refer to a device output that is tactilely perceptible along the user's body as series localized impulses that are generally dynamic in nature. As used herein, the term "localized impulse" may be used to refer to a brief force acting along a portion of a user's body. As described herein, a portion of the haptic output may be created by one or more actuation cells that are inflated and deflated to produce a tactilely perceptible impulse.

In some cases, the actuation cells are configured to actuate in response to fluid being introduced into and/or removed from the actuation cells. As used herein, "fluid" may be used to refer to substances that have no fixed shape, which allows them to flow, including air, other gasses, liquids, and combinations thereof. The in-bed haptic device may include an enclosure that is configured to be placed beneath a user during use. In some cases, the in-bed haptic device may be positioned between a mattress and a user during use. The in-bed haptic device may provide haptic outputs along a top external surface that may be perceived tactilely (e.g., sensed through touch) by the user. The in-bed haptic device may be sufficiently thin and/or flexible so that the in-bed haptic device, when positioned in a bed beneath the user, does not cause discomfort.

The actuation cells may cause deformation and/or displacement of the top external surface to provide haptic outputs and/or portions thereof. Actuation of a particular actuation cell may cause deformation and/or displacement of a corresponding portion of the top external surface. As used herein, "deformation" may be used to refer to changing a shape or contour of a surface, element, or a portion thereof, and "displacement" may be used to refer to moving a surface, element, or a portion thereof from a first position to one or more additional positions relative to one or more additional surfaces, elements, or portions thereof. Generally, when a surface, element, or portion thereof is deformed, at least a portion of it is displaced. For example, if the top external surface is deformed, a portion of the top external surface will necessarily be moved relative to another portion of the top external surface. However, displacement does not necessarily require deformation. For example, the entire top external surface may be displaced relative to other components of the in-bed haptic device without changing a shape or contour of the top external surface.

In some cases, deformation caused by the actuation cells may be local deformation. As used herein, "local deformation" or "locally deforming" may be used to refer to deforming a localized portion of a surface or element while not deforming one or more other portions of the surface or element (e.g., portions surrounding the localized portion). Multiple actuation cells may cooperate to locally deform the top external surface of the in-bed haptic device. Multiple portions of a surface or element may be locally deformed at the same time, during overlapping time periods, and/or at different times (e.g., sequentially).

In some cases, multiple actuation cells may cooperate to produce a haptic output. Multiple portions of the top external surface may be displaced and/or deformed by actuation of multiple different actuation cells to produce a haptic output. In some cases, multiple different portions of the top external surface are displaced and/or deformed according to a pattern to provide a haptic output. In some cases, actuation of the actuation cells in a predetermined sequence may cause the external surface to displace and/or deform according to an actual or simulated randomized pattern (e.g., no pattern is discernable). For example, the predetermined sequence may simulate a pattern of falling raindrops. In some cases, actuation of the actuation cells in a predetermined sequence may cause the external surface to displace and/or deform according to an ordered (e.g., non-random) pattern. For example, the predetermined sequence may simulate a wave moving at least partially across the top external surface of the in-bed haptic device.

Each actuation cell of the array of actuation cells may include one or more bladders defining an interior volume and configured to inflate and/or deflate to cause the actuation cells to actuate to provide haptic outputs and/or portions of haptic outputs. For example, inflation of the one or more bladders may cause the actuation cell to expand and deflation of the one or more bladders may cause the actuation cell to contract. Each bladder may be configured to inflate in response to a pressurized air (or another fluid) being introduced into the interior volume and/or deflate in response to a pressurized air being removed from the interior volume. In some cases, each actuation cell of the array of actuation cells is configured to expand in a direction that is substantially transverse to the top external surface, thereby increasing a thickness of a region of the in-bed haptic device corresponding to the cell.

The in-bed haptic device may be fluidly coupled to a control system that is configured to introduce pressurized air into the bladders of the array of actuation cells and/or remove pressurized air from the bladders of the array of actuation cells to provide haptic outputs. The control system may include one or more reservoirs configured to facilitate rapid inflation and/or deflation of bladders. In some cases, the control system includes one or more high pressure reservoirs containing air having a pressure that is higher than atmospheric pressure and/or one or more vacuum reservoirs containing air having a pressure that is lower than atmospheric pressure. A valve array of the control system may be configured to selectively fluidly couple each cell (e.g., the bladder(s) of each actuation cell) to one or more reservoirs.

For example, the control system (e.g., a processing unit of the control system) may cause a valve between a bladder of an actuation cell and the high pressure reservoir to open to inflate the bladder. Similarly, the control system may cause a valve between a bladder of an actuation cell and the vacuum reservoir to deflate the bladder.

In some cases, a processing unit may provide signals to the control system and/or the in-bed haptic device to provide haptic outputs. The processing unit may be a component of the in-bed haptic device, the control system, or another electronic device operably coupled to the in-bed haptic device and/or the control system. The in-bed haptic device, the control system, and/or another device operably connected to the processing unit may include one or more input devices (e.g., contact sensors, force sensors, audio sensors, biometric sensors, images sensors, light sensors and the like) configured to detect inputs that are used by the processing unit to determine to provide haptic outputs and/or the types of haptic outputs to provide. The processing unit may determine a haptic output to provide in response to one or more detected inputs, and may control various components of the control system and/or the in-bed haptic device (e.g., valves, pumps, etc.) to provide the haptic output.

The inputs received by the processing unit may be used to determine triggers for providing haptic outputs. Triggers may include user conditions that indicate whether a user is asleep or awake, present or not present, snoring or not snoring, and the like. User conditions may be determined by analyzing signals from input devices (e.g., contact sensors, force sensors, audio sensors, biometric sensors, images sensors, light sensors, and the like). For example, the processing unit may determine user conditions by determining breathing information (e.g., instantaneous breathing rate, average breathing rate, maximum breathing rate, minimum breathing rate), user movement or presence information (e.g., using a force or pressure sensor or transducer), heart information (e.g., instantaneous heart rate, average heart rate, maximum heart rate, minimum heart rate) determined from contact sensors, force sensors, audio sensors, biometric sensors, and the like. Triggers may also include raw inputs received from the in-bed haptic device and/or other devices, outputs provided by a device (e.g., audio outputs, video outputs, haptic outputs, alerts or alarms, and the like), and other conditions (e.g., time of day, temperature, humidity, weather, and other environmental conditions). In response to detecting or determining one or more triggers, the processing unit may determine one or more haptic outputs to be provided and cause the control system and/or the in-bed haptic device to provide the haptic output(s).

In some cases, the actuation cells may be individually addressed. As used herein, "individually addressed" may be used to refer to actuation cells that may be controlled independently of one another. In some cases, each actuation cell may be controlled independently of all other actuation cells of the array of actuation cells. In some cases, actuation cells may be grouped into cell groups, and the actuation cells in the cell group are controlled together, but independently of other cell groups and/or actuation cells.

The control system may include one or more pumps configured to establish and maintain the pressure(s) of the reservoirs. The control system may include a pressurizing pump configured to increase the pressure and/or maintain the increased pressure in the high pressure reservoir. The control system may include a vacuum pump configured to decrease the pressure and/or maintain the decreased pressure in the vacuum reservoir. Using the reservoirs for inflating and/or deflating the bladders of individual actuation cells of the in-bed haptic device may allow the individual cells to be inflated and/or deflated more rapidly than using pumps to inflate and/or deflate the bladders. The pumps of the control system can pressurize or depressurize the reservoirs over a long period of time in advance of providing haptic outputs to "charge" the reservoirs so that more rapid pressure changes may occur. In addition, using the reservoirs for inflating and/or deflating the bladders of the in-bed haptic device may reduce potential disturbances (e.g., sound, vibration, and the like) that would be created by using a pump for inflation and/or deflation. For example, the pumps of the control system can pressurize or depressurize the reservoirs before use of the in-bed haptic device (e.g., while a user is not present), thereby minimizing disturbances to users.

The control system may include one or more connectors that fluidly couple the control system (e.g., the reservoirs) to the in-bed haptic device. The in-bed haptic device may include passages that fluidly couple actuation cells and corresponding bladder(s) of the array of actuation cells to one or more connectors. The connectors and the passages may cooperate to define fluid paths that fluidly couple the reservoirs to the actuation cells of the array of actuation cells. As noted above, one or more valves (e.g., a valve array) are operable to control the fluid coupling between the reservoirs and the actuation cells. For example, a valve may be opened to fluidly couple one or more bladders to a reservoir via one or more connectors so that fluid may flow between the bladders and the reservoir. Similarly, a valve may be closed to terminate a fluid coupling so that fluid may not flow between the bladders and the reservoir. The valves may be positioned at any suitable location along the fluid path between a reservoir and one or more bladders, including within the control system, connector(s), passages, or actuation cells. The connectors of the control system allow the control system and the in-bed haptic device to be positioned separately from one another. In some cases, the control system may be located far enough away from the in-bed haptic device (and the user), such as in another room, that potential disturbances (e.g., sounds, vibrations, and the like) produced by the control system may not disturb a user.

In some cases, a thickness of the in-bed haptic device is much smaller than its length and/or width. For example, the thickness (e.g., a distance between a top surface and a bottom surface) of the in-bed haptic device may be less than approximately ten percent, five percent, or even one percent of the width of the in-bed haptic device. The thickness of the in-bed haptic device may be less than approximately one percent, one half of one percent, or even one tenth of one percent of the length of the in-bed haptic device. The dimensions of the in-bed haptic device may provide numerous advantages, including increasing a flexibility of the in-bed haptic device, improving comfort of the in-bed haptic device, and/or reducing a user-perceptibility of the in-bed haptic device during use.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" may be used to refer to two or more devices that are coupled in any suitable manner for operation and/or communication, including wiredly, wirelessly, or some combination thereof. As used herein, "fluidly coupled" may be used to refer to two or more volumes, elements structure, objects components, parts, or the like that are in fluid communication with one another such that fluid may flow between or among the two or more volumes, elements structure, objects components, parts, or the like.

These and other embodiments are discussed with reference to FIGS. 1-11. However, those skilled in the art will readily appreciate that the detailed description given herein with respect to these figures is for explanatory purposes only and should not be construed as limiting.

FIG. 1 shows an example environment for using an in-bed haptic device 100 (shown in phantom). As shown in FIG. 1, the in-bed haptic device 100 may be positioned beneath a user 102 as the user is in a bed 104. The in-bed haptic device 100 may be adapted to provide haptic outputs to users. The haptic outputs provided by the in-bed haptic device 100 may be provided in response to detected inputs at the in-bed haptic device or another electronic device, or in association with notifications, alerts, or other outputs at the in-bed haptic device or another electronic device.

In some cases, the in-bed haptic device 100 is adapted to be positioned between a user 102 and a mattress 106 of a bed 104. The in-bed haptic device 100 may be sufficiently thin and/or flexible so that the in-bed haptic device, when positioned in a bed 104 beneath a user 102, does not cause discomfort. In some cases, a thickness of the in-bed haptic device 100 is much smaller than its length and/or width. For example, the thickness (e.g., a distance between a top surface and a bottom surface) of the in-bed haptic device 100 may be less than approximately ten percent, five percent, or even one percent of the width of the in-bed haptic device. The thickness of the in-bed haptic device 100 may be less than approximately one percent, one half of one percent, or even one tenth of one percent of the length of the in-bed haptic device. The dimensions of the in-bed haptic device 100 may provide numerous advantages, including increasing a flexibility of the in-bed haptic device, improving comfort of the in-bed haptic device, and/or reducing a user-perceptibility of the in-bed haptic device during use.

The in-bed haptic device 100 may include an array of actuation cells configured to expand and/or contract to provide haptic outputs and/or portions thereof. Actuation cells of the array of actuation cells may be configured to actuate (e.g., expand, contract, or otherwise change shape) in a predetermined sequence to provide haptic outputs. In some cases, the actuation cells include one or more bladders configured to inflate and/or deflate to actuate the actuation cells. The in-bed haptic device 100 may include an enclosure that is configured to be placed beneath a user 102 during use. The in-bed haptic device 100 may provide haptic outputs along a top external surface of the enclosure that may be perceived tactilely by the user 102. In some cases, the top external surface of the enclosure defines a modifiable contour, and actuation of the actuation cells modifies the modifiable contour to provide haptic outputs.

In various embodiments, the in-bed haptic device 100 and/or the control system 150 may be connected to a companion device configured to provide triggers for providing haptic outputs, control signals, and other information. The companion device may be any suitable electronic device, including sleep monitors, wearable electronic devices, timekeeping devices, health monitoring or fitness devices, portable computing devices, mobile phones (including smart phones), tablet computing devices, digital media players, virtual reality devices, audio devices (including earbuds and headphones), and the like.

In some cases, the haptic outputs may correspond to inputs, outputs, alerts, or notifications at the in-bed haptic device or another electronic device. As another example, a haptic output may correspond to an alert or notification received at the in-bed haptic device 100 or a connected device, such as a phone call, a received message, a push notification, or the like. In some cases, an alert may correspond to a biometric or similar characteristic of the user 102. For example, the haptic output may be provided in response to a heart rate, breathing rate, or other biometric detected by the in-bed haptic device 100 or another device falling above or below a predetermined threshold.

In various embodiments, the haptic outputs may be provided while a user is awake or asleep. In some cases, the in-bed haptic device 100 or another device may detect whether a user is awake or asleep and may provide, modify, or cease a haptic output in response to the determination.

The in-bed haptic device 100 may be positioned above or beneath a mattress 106 and/or bed frame 110 of the bed 104. The in-bed haptic device 100 may be positioned above or beneath bedding of the bed 104, including a mattress protector, sheets, blankets, and the like. In some cases, the in-bed haptic device 100 is positioned above the mattress 106 and beneath at least some layers of bedding. For example, the in-bed haptic device 100 may be positioned above a mattress protector, but beneath a bottom sheet of the bedding. In some cases, the in-bed haptic device 100 includes adhesive along one or more surfaces so that the in-bed haptic device 100 may be attached or coupled to the mattress 106 or bedding of the bed (e.g., a mattress protector). In some cases, the in-bed haptic device 100 is placed between approximately 10 and 40 centimeters from a pillow 108. The in-bed haptic device 100 may be centered in a sleeping area of the user 102.

The in-bed haptic device 100 may be operably and/or fluidly coupled to a control system 150. The control system 150 may be configured to introduce pressurized air into one or more actuation cells (e.g., into an interior volume of the bladder(s)) of the in-bed haptic device 100 and/or remove pressurized air from one or more actuation cells (e.g., from an interior volume of the bladder(s)) of the in-bed haptic device in a predetermined sequence to provide haptic outputs. As discussed in more detail below with respect to FIG. 4, the control system 150 may cause haptic outputs provided by the in-bed haptic device 100 in response to receiving signals from a processing unit (e.g., a processing unit of the control system 150 or a processing unit of another electronic device).

The control system 150 and/or the in-bed haptic device 100 may include one or more connectors 112 that fluidly couple the control system to the in-bed haptic device. The connector(s) 112 of the control system 150 allow the control system and the in-bed haptic device 100 to be positioned separately from one another. In some cases, the control system 150 may be located far enough away from the in-bed haptic device 100 (and the user 102), such as in another room, that potential disturbances (e.g., sounds, vibrations, and the like) produced by the control system 150 may not disturb the user 102.

Figure 2A:
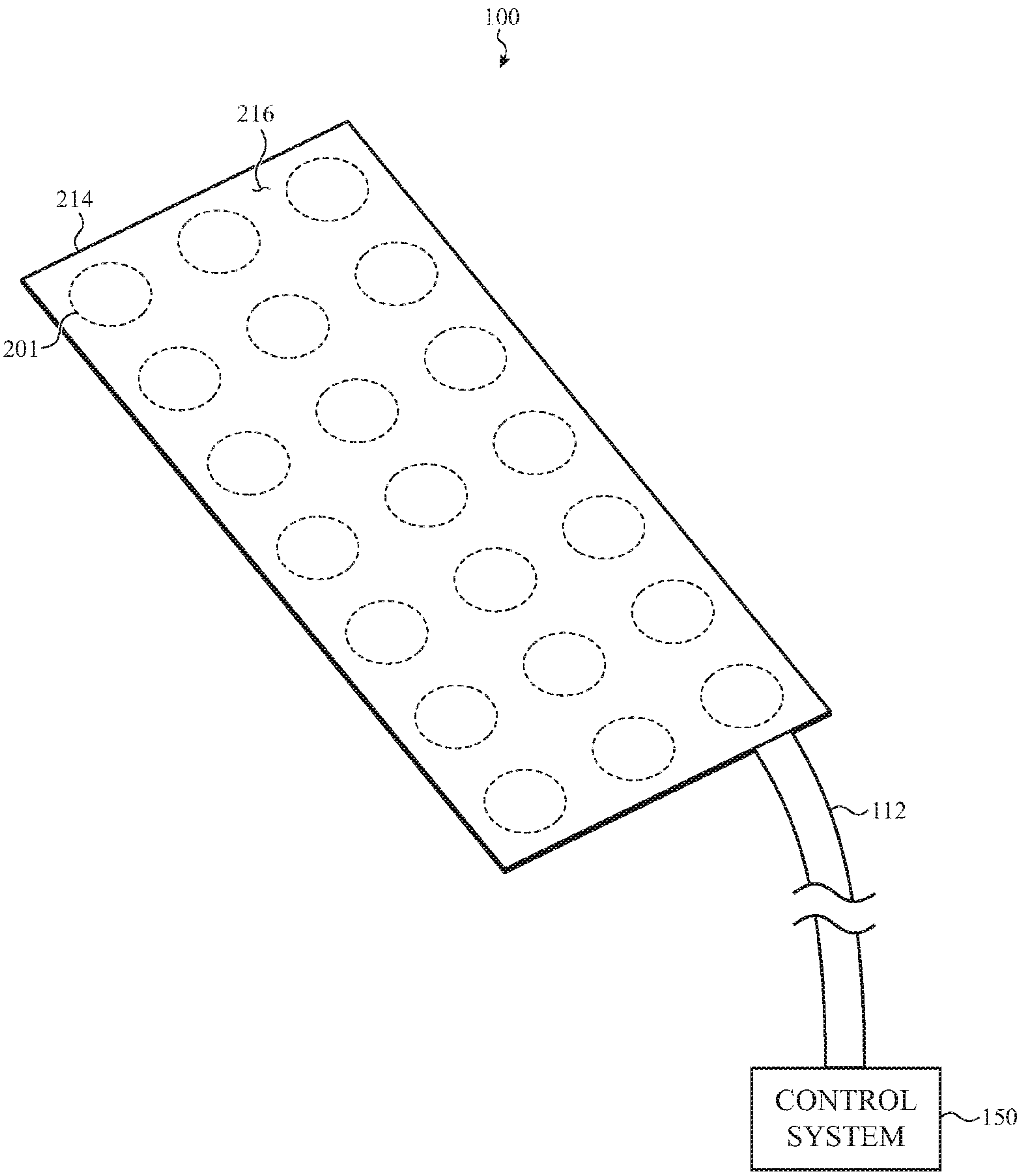
FIG. 2A shows the example in-bed haptic device and the control system of FIG. 1.

FIG. 2A shows the in-bed haptic device 100 and the control system 150 of FIG. 1. As noted above, the in-bed haptic device 100 may include an array of actuation cells 201 (shown in phantom in FIG. 2A) configured to actuate (e.g., expand, contract, or otherwise change shape) to provide haptic outputs and/or portions thereof. The in-bed haptic device 100 may include an enclosure 214 other external layer that at least partially surrounds the actuation cells 201 and/or other components of the in-bed haptic device 100. The enclosure 214 may contain and/or protect the actuation cells 201 and/or other components of the in-bed haptic device 100. In some cases, the enclosure 214 is flexible. One or more surfaces of the enclosure 214 may include an adhesive or a high-friction material(s) configured to maintain the in-bed haptic device 100 in place.

The enclosure 214 may define a top external surface 216 of the in-bed haptic device 100. In various embodiments, haptic outputs provided by the in-bed haptic device 100 may be provided at and/or through the top external surface 216. In some cases, the top external surface 216 defines a modifiable contour, and actuation of the actuation cells modifies the modifiable contour to provide haptic outputs. In various embodiments, the enclosure 214 may not fully enclose or surround the components of the in-bed haptic device 100. For example, the enclosure 214 may be defined by top and bottom layers with components of the in-bed haptic device 100 in between, in which case the sides of the in-bed haptic device 100 may not be enclosed by the enclosure 214. In some cases, the enclosure 214 has an open top (e.g., the enclosure 214 does not enclose at least a portion of the top of the in-bed haptic device). For example, the array of actuation cells may define at least a portion of the top external surface 216.

The in-bed haptic device 100 may include an array of actuation cells 201 configured to expand and/or contract in predetermined sequences to provide haptic outputs. Each actuation cell 201 of the array of actuation cells may include one or more bladders defining an interior volume and configured to inflate and/or deflate to cause the actuation cells to actuate to provide haptic outputs and/or portions of haptic outputs. For example, inflation of the one or more bladders may cause the actuation cell 201 to expand and deflation of the one or more bladders may cause the actuation cell to contract. Each bladder may be configured to inflate in response to a pressurized air (or another fluid) being introduced into the interior volume and/or deflate in response to a pressurized air being removed from the interior volume. In some cases, each actuation cell 201 of the array of actuation cells is configured to expand in a direction that is substantially transverse to the top external surface 216, thereby increasing a thickness of a region of the in-bed haptic device 100 corresponding to the cell 201. The in-bed haptic device 100 is shown in FIG. 2A as having twenty-one actuation cells 201 ordered in a two-dimensional array. This is an example and is not meant to be limiting. The in-bed haptic devices described herein may include any suitable number of actuation cells arranged in any suitable way.

As noted above, each actuation cell 201 may be individually addressed. In some cases, each actuation cell 201 may be controlled independently of all other actuation cells of the array of actuation cells. For example, providing a haptic output may include inflating a first actuation cell 201 while maintaining an adjacent actuation cell 201 in an uninflated state. In some cases, actuation cells 201 may be grouped into cell groups, and the actuation cells in the cell group are controlled together, but independently of other cell groups and/or actuation cells. To facilitate the independent control of the actuation cells 201, each actuation cell may be independently fluidly coupled (or capable of being fluidly coupled) to the control system 150. For example, each actuation cell 201 may be fluidly coupled to the control system 150 by one or more fluid paths defined in the in-bed haptic device 100, the connector 112, and/or the control system 150. In some cases, as discussed in more detail below with respect to FIG. 4, one or more valves may be positioned along the fluid path between each actuation cell 201 and the control system 150 to control the fluid coupling.

The actuation cells 201 may cause deformation and/or displacement of the top external surface 216 to provide haptic outputs and/or portions thereof. Actuation of a particular actuation cell 201 may cause deformation and/or displacement of a corresponding portion of the top external surface 216. For example, an actuation cell 201 may inflate (partially or fully) to provide a first portion of a haptic output (e.g., a first localized impulse) and may deflate (partially or fully) to provide a second portion of a haptic output (e.g., a first localized impulse). In addition, an actuation cell 201 may remain static (e.g., deflated, partially inflated, or fully inflated) during a haptic output (e.g., between inflation or deflation or while one or more other actuation cells inflate or deflate).

As noted above, as used herein, the term "haptic output" may be used to refer to a device output that is tactilely perceptible along the user's body as series localized impulses that are generally dynamic in nature, and the term "localized impulse" may be used to refer to a brief force acting along a portion of a user's body. A haptic output or a portion thereof may be provided by an actuation (e.g., an inflation or deflation) of one or more actuation cells 201. In some cases, the duration of an actuation of an actuation cell 201, such as an inflation period (e.g., a duration that an actuation cell is inflating) or a deflation period (e.g., a duration that an actuation cell is deflating) may be sufficiently short in duration such that the inflation and/or deflation is perceived by a user as a localized impulse. In some cases, the duration of the actuation is less than about 0.5 seconds. In some cases, the duration of the actuation is less than about one second. In some cases, the duration of the actuation is less than about five seconds.

In some cases, the duration of an actuation may be relatively long (e.g., greater than about five seconds, greater than about 10 seconds). Similarly, a static period (e.g., a duration that an actuation cell 201 is not inflating or deflating) may be relatively short (e.g., less than about 0.5 seconds, less than about one second, less than about five seconds) or relatively long (greater than about five seconds, greater than about 10 seconds). The lengths of inflation periods, deflation periods, and static periods may be varied to provide varying haptic outputs or portions of haptic outputs. For example, a relatively short inflation period, deflation period, and/or static period may be perceived as a higher-energy pulse or a tap, while a relatively long inflation period, deflation period, and/or static period may be perceived as a lower-energy output.

In some cases, the haptic outputs include localized haptic outputs produced by one or more actuation cells 201, in which a portion of the top external surface 216 is locally displaced (e.g., moved) and/or deformed (e.g., changed in shape) relative to other portions of the top external surface. Localized haptic outputs may simulate a pulse or a tap. In some cases, the haptic outputs include global haptic outputs in which many actuation cells 201 cooperate to displace and/or deform all or substantially all (e.g., greater than 75%) of the top external surface.

Figure 2B:
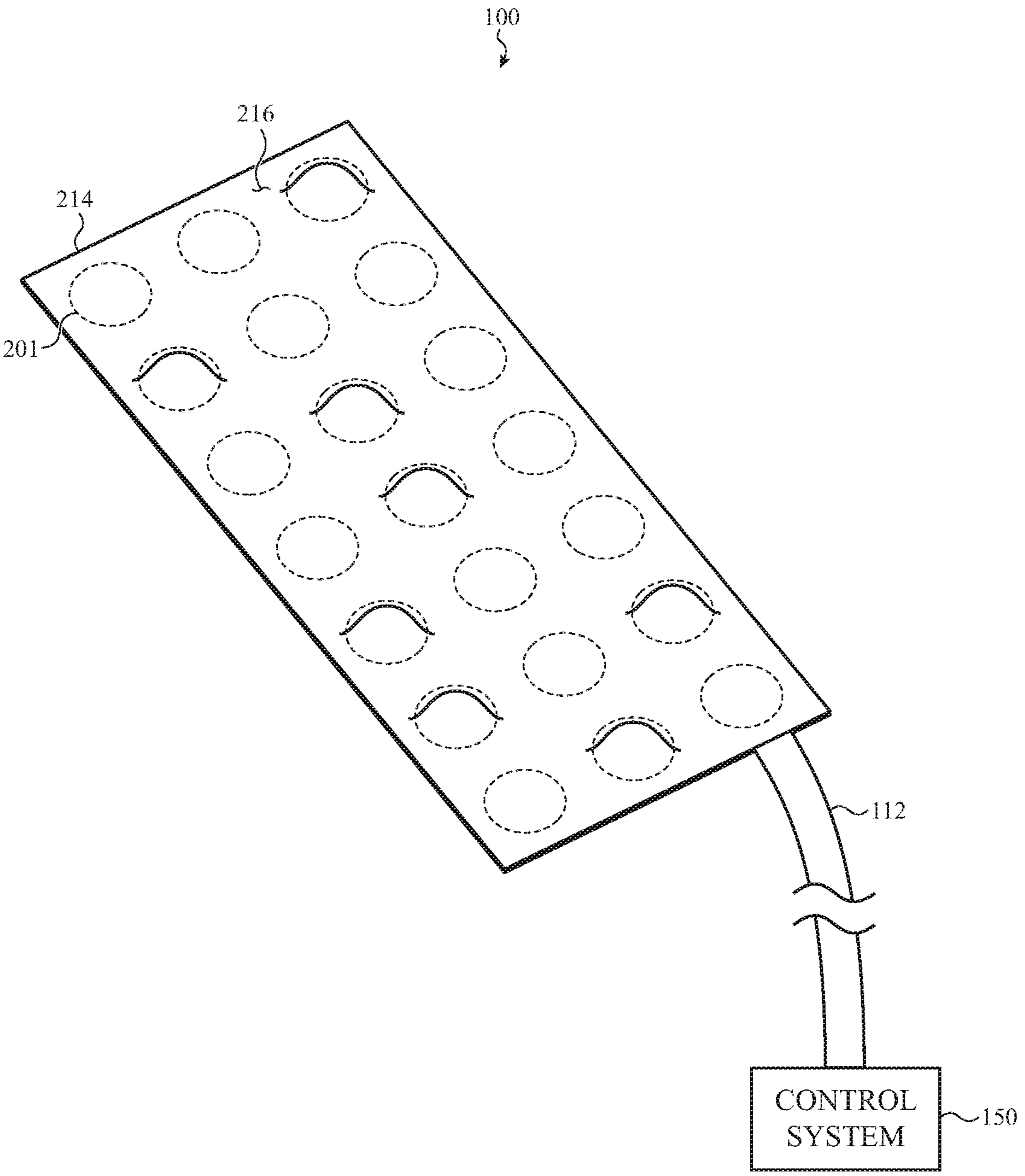
FIGS. 2B-2C show an example haptic output provided by the in-bed haptic device of FIG. 1.
Figure 2C:
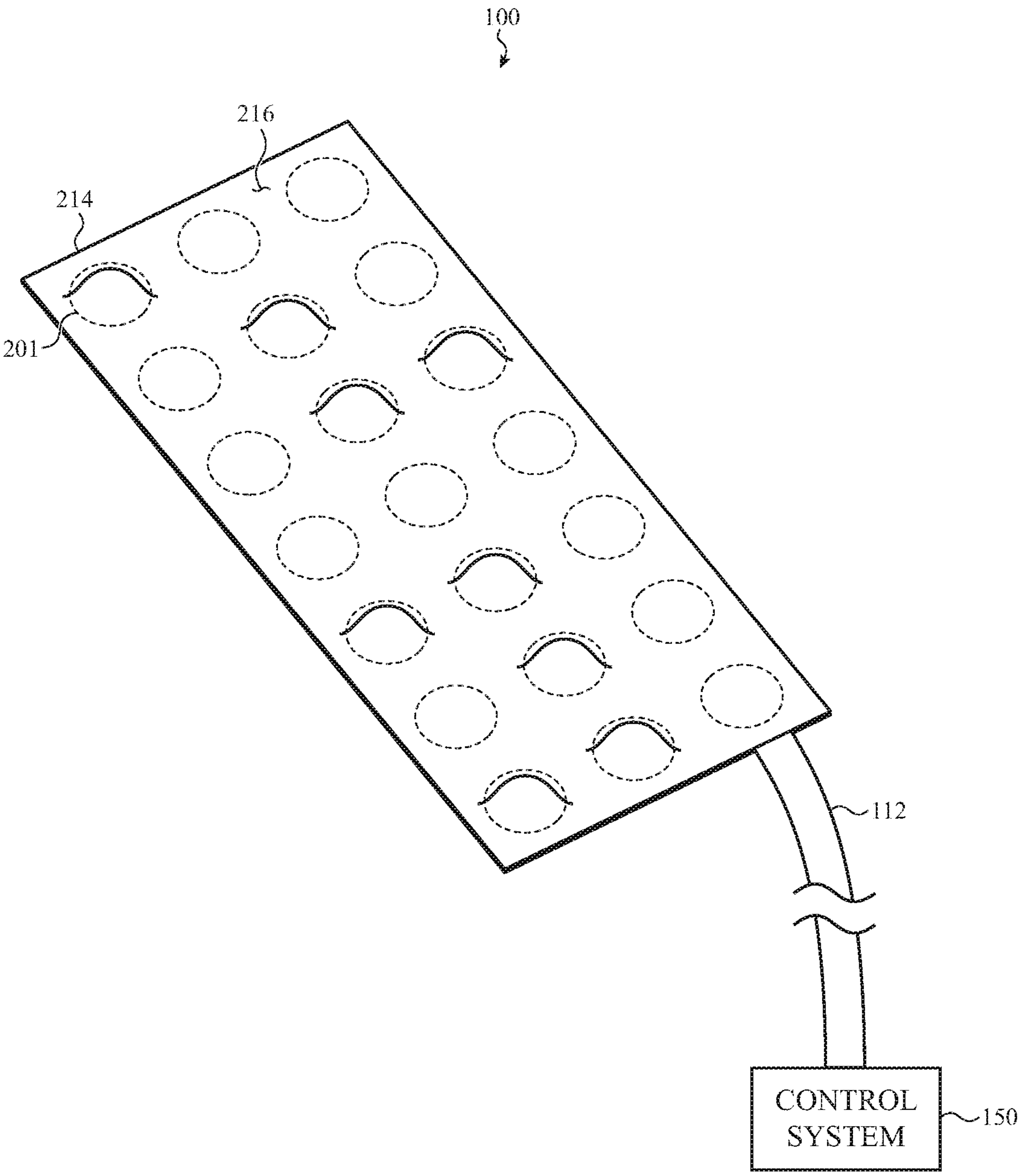

In some cases, multiple actuation cells 201 may cooperate to produce a haptic output. Multiple portions of the top external surface 216 may be displaced and/or deformed by actuation of multiple different actuation cells 201 to produce a haptic output. In some cases, multiple different portions of the top external surface 216 are displaced and/or deformed in different manners according to a pattern to provide a haptic output. In some cases, actuation of the actuation cells 201 in a predetermined sequence may cause the external surface 216 to displace and/or deform according to an actual or simulated randomized pattern (e.g., no ordered pattern is discernable). In some cases, for example, the actual or simulated randomized pattern may simulate a pattern of falling raindrops. For example, a first group of one or more actuation cells 201 may inflate (partially or fully) at a first time or part of a predetermined sequence as shown in FIG. 2B, and a second group of one or more actuation cells 201 may inflate (partially or fully) at a second time or part of a predetermined sequence as shown in FIG. 2C. Different actuation cells 201 of the array of actuation cells may have inflation periods, deflation periods, and/or static periods having different lengths during a haptic output. Similarly, the same actuation cell 201 may have inflation periods, deflation periods, and or static periods having different lengths during a haptic output. In some cases, the inflation periods, deflation periods, and/or static periods of an actuation cell 201 may overlap in time with the inflation periods, deflation periods, and/or static periods of other actuation cells during a haptic output.

Figure 3A:
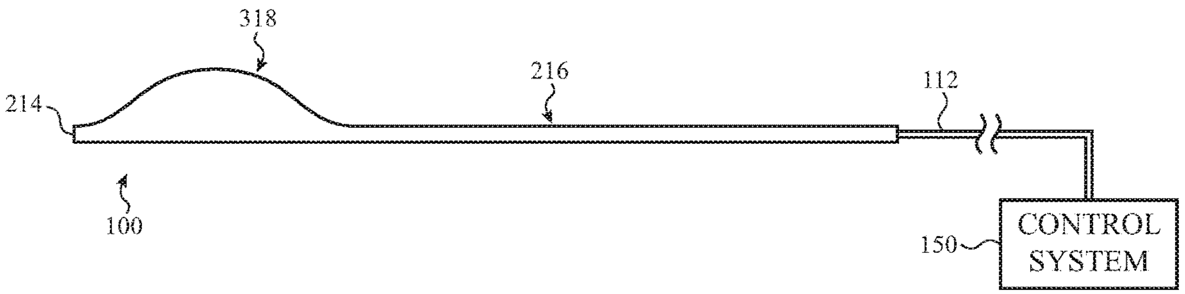
FIGS. 3A-3C show an example haptic output provided by the in-bed haptic device of FIG. 1.
Figure 3B:
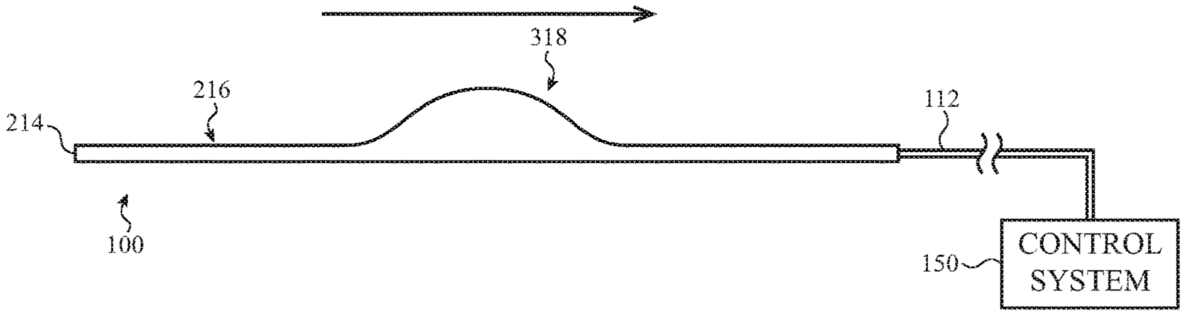
Figure 3C:
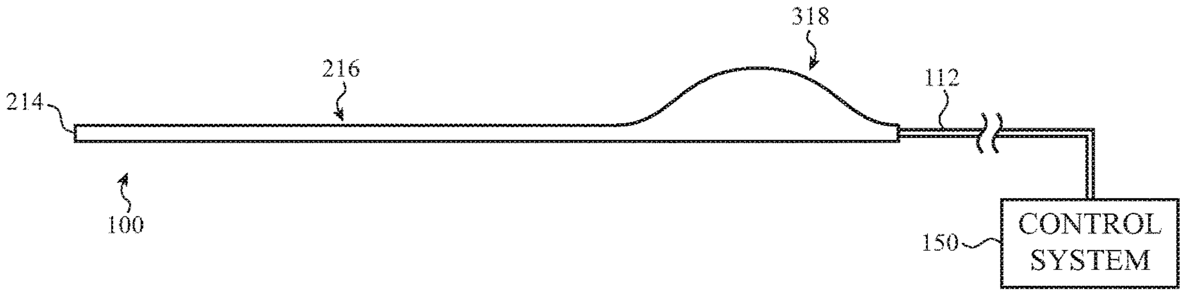

In some cases, actuation of the actuation cells 201 in a predetermined sequence may cause the external surface 216 to displace and/or deform according to an ordered (e.g., non-random) pattern. Multiple actuation cells 201 may cooperate to displace and/or deform the external surface 216 according to an ordered pattern. For example, as shown in FIGS. 3A-3C, the ordered pattern may cause a feature 318 formed by one or more actuation cells 201 to move along the external surface 216. In some cases, for example, the ordered pattern may simulate a wave or other feature moving at least partially across the external surface 216 of the in-bed haptic device 100.

The in-bed haptic device 100, the control system 150, and/or another device that includes and/or is operably connected to a processing unit may include one or more input devices (e.g., contact sensors, force sensors, audio sensors, biometric sensors, images sensors, light sensors, and the like) configured to detect inputs that are used by the processing unit to determine to provide haptic outputs and/or the types of haptic outputs to provide. The processing unit may determine a haptic output to provide in response to one or more detected inputs, and may control various components of the control system 150 and/or the in-bed haptic device 100 (e.g., valves, pumps, etc.) to provide the haptic output. Input devices and detected inputs are discussed in more detail below with respect to FIGS. 4 and 5.

Figure 4:
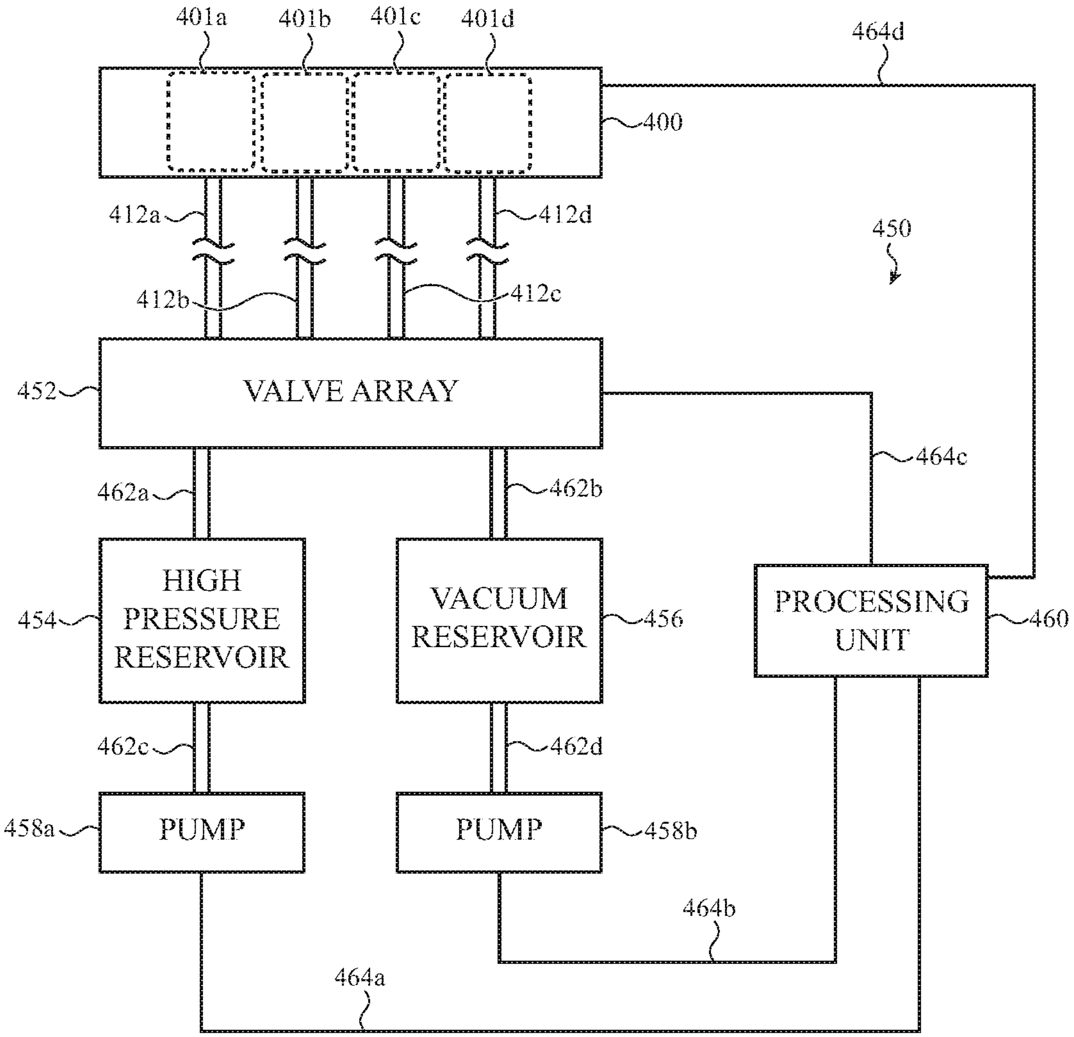
FIG. 4 shows an example block diagram of a control system that is fluidly coupled to an in-bed haptic device.

As noted above, the in-bed haptic device may be fluidly coupled to a control system that is configured to introduce pressurized air into the actuation cells and/or remove pressurized air from the actuation cells. FIG. 4 shows an example block diagram of a control system 450 that is fluidly coupled to an in-bed haptic device 400. The control system 450 and the in-bed haptic device 400 may be similar to the control system 150 and the in-bed haptic device described above, and may include similar structure and/or functionality.

The control system 450 may include a high pressure reservoir 454, a vacuum reservoir 456, pumps 458*a*, 458*b*, a valve array 452, and a processing unit 460. The in-bed haptic device may include an array of actuation cells 401*a*, 401*b*, 401*c*, 401*d* that are configured to actuate (e.g., expand, contract, or otherwise change shape) in a predetermined sequence to provide haptic outputs. In some cases, each actuation cell 401 includes one or more bladders configured to inflate and/or deflate to actuate the actuation cells.

The control system 450 may include one or more reservoirs 454, 456 configured to facilitate rapid inflation and/or deflation of bladders of the actuation cells 401. In some cases, the control system 450 includes one or more high pressure reservoirs 454 containing air (or another fluid) having a pressure that is higher than atmospheric pressure and/or one or more vacuum reservoirs 456 containing air (or another fluid) having a pressure that is lower than atmospheric pressure. The reservoirs 454, 456 may be any suitable containers having a fixed or variable volume, such as a tank, a bladder, or the like. The reservoirs 454, 456 may be formed of any suitable material(s), including polymers (e.g., PVC, polyurethane, NOMEX, HYPALON, thermoplastic, polyethylene, polyimide, cellulose, etc.), rubber, synthetic rubber, metal (e.g., aluminum, copper, etc.), fiber reinforced materials, composite materials, and the like.

The control system 450 may include one or more pumps 458*a*, 458*b* configured to establish and maintain the pressure(s) of the reservoirs 454, 456. The control system 450 may include a pressurizing pump 458*a* configured to increase the pressure and/or maintain the increased pressure in the high pressure reservoir 454. The control system may include a vacuum pump 458*b* configured to decrease the pressure and/or maintain the decreased pressure in the vacuum reservoir 456.

Using the reservoirs 454, 456 for inflating and/or deflating the bladders of individual actuation cells 401 of the in-bed haptic device 400 may allow the individual cells to be inflated and/or deflated more rapidly than using pumps to inflate and/or deflate the bladders. The pumps 458*a*, 458*b* of the control system 450 can pressurize or depressurize the reservoirs 454, 456 over a long period of time in advance of providing haptic outputs to “charge” the reservoirs so that more rapid pressure changes may occur. In addition, using the reservoirs 454, 456 for inflating and/or deflating the bladders of the in-bed haptic device 400 may reduce potential disturbances (e.g., sound, vibration, and the like) that would be created by using a pump for inflation and/or deflation. For example, the pumps 458*a*, 458*b* of the control system 450 can pressurize or depressurize the reservoirs 454, 456 before use of the in-bed haptic device 400 (e.g., while a user is not present), thereby minimizing disturbances to users. The pumps 458*a*, 458*b* may be any suitable type of pump or compressor, including diaphragm-type, piston- or reciprocating-type, plunger-type, rotary-type, scroll-type, diffusion-type, sublimation-type, sorption-type, ion-type, and the like. In some cases, the pumps 458*a*, 458*b* are combined in a single compressor/vacuum pump that is capable of pressurizing and depressurizing the reservoirs 454, 456. The pumps 458*a*, 458*b* may be sufficiently quiet that they do not disturb users while sleeping. For example, the pumps 458*a*, 458*b* may include scroll-type, or rotary-type, or diffusion-type compressors or pumps.

The in-bed haptic device 400 may be fluidly coupled to the control system 450 by one or more connectors 412*a*, 412*b*, 412*c*, 412*d*. In some cases, each connector 412*a*, 412*b*, 412*c*, 412*d* connects one or more reservoirs 454, 456 of the control system 450 to a respective actuation cell 401*a*, 401*b*, 401*c*, 401*d*. As noted above, each actuation cell 401 may be individually addressed. To facilitate the independent control of the actuation cells 401, each actuation cell may be independently fluidly coupled (or capable of being fluidly coupled) to the control system 450. For example, each actuation cell 401 may be fluidly coupled to the control system 450 by one or more fluid paths defined by the in-bed haptic device 400, the connectors 412*a*, 412*b*, 412*c*, 412*d*, and/or the control system 450. Each of connectors 412*a*, 412*b*, 412*c*, and 412*d* may define at least a portion of a fluid path between the reservoirs 454, 456 and the bladders of a respective actuation cell 401*a*, 401*b*, 401*c*, 401*d*.

In some cases, the connectors 412*a*, 412*b*, 412*c*, and 412*d* cooperate with passages defined in the in-bed haptic device 400 and/or the control system 450 to fluidly coupled one or more reservoirs 454, 456 of the control system 450 to a respective actuation cell 401*a*, 401*b*, 401*c*, 401*d*. The connectors 412 of the control system 450 allow the control system 450 and the in-bed haptic device 400 to be positioned separately from one another. In some cases, the control system 450 may be located far enough away from the in-bed haptic device 400 (and the user), such as in another room, that potential disturbances (e.g., sounds, vibrations, and the like) produced by the control system may not disturb a user.

The connectors 412*a*, 412*b*, 412*c*, 412*d* may be separate from one another (e.g., hoses, tubes, etc.) or may be passages through one or more shared components. The connectors 412*a*, 412*b*, 412*c*, 412*d* may be formed of any suitable material(s), including polymers (e.g., PVC, polyurethane, NOMEX, HYPALON, thermoplastic, polyethylene, polyimide, cellulose, etc.), rubber, synthetic rubber, metal (e.g., aluminum, copper, etc.), fiber reinforced materials, composite materials, and the like.

The control system 450 may include one or more valves (e.g., a valve array 452) configured to control the fluid coupling between each actuation cell 401*a*, 401*b*, 401*c*, 401*d* (e.g., the bladder(s) of each actuation cell 401) and the one or more reservoirs 454, 456. A valve of the valve array 452 may be opened to fluidly couple one or more bladders to a reservoir 454, 456 via one or more connectors so that fluid may flow between the bladders and the reservoir. Similarly, a valve of the valve array 452 may be closed to terminate a fluid coupling so that fluid may not flow between the bladders and the reservoir 454, 456. The processing unit 460 of the control system 450 may cause a valve between a bladder of an actuation cell 401 and the high pressure reservoir 454 to open to inflate the bladder. Similarly, the control system 450 may cause a valve between a bladder of an actuation cell 401 and the vacuum reservoir 456 to deflate the bladder. In some cases, the valves may be used to modulate the flow between actuation cells 401 and a reservoir 454, 456. For example, a flow may be decreased or increased using a valve.

The valves (e.g., the valve array 452) may be positioned at any suitable location along the fluid path between a reservoir 454, 456 and one or more bladders, including within the control system 450, connector(s) 412, in-bed haptic device 400, or actuation cells 401. The valves of the valve array 452 may be operably coupled to the processing unit 460 by a connector 464*c*. The valve array may include one or more motors, servos, or the like to control (e.g., open, close) the valves in response to signals received from the processing unit 460. The valves of the valve array 452 may be any suitable type of valves, including ball valves, butterfly valves, choke valves, diaphragm or membrane valves, gate valves, globe valves, knife valves, needle valves, pinch valves, piston valves, plug wave valves, solenoid valves, spool valves, or the like.

The in-bed haptic device 400 may be operably coupled to the processing unit 460 by a connector 464*d*. The processing unit 460 may receive signals (e.g., sensor signals, etc.) from the in-bed haptic device 400 and provide signals (e.g., valve control signals, etc.) to the in-bed haptic device. In some cases, the processing unit 460 determines to provide a haptic output and/or a type of haptic output to provide in response to signals received from the in-bed haptic device 400. The processing unit 460 may be positioned within and/or be a component of the in-bed haptic device 400, the control system 450, or another device (e.g., a companion device).

The in-bed haptic device 400, the control system 450, and/or another device that includes and/or is operably connected to a processing unit 460 may include one or more input devices (e.g., contact sensors, force sensors, audio sensors, biometric sensors, images sensors, light sensors, and the like) configured to detect inputs that are used by the processing unit to determine to provide haptic outputs and/or the types of haptic outputs to provide. The processing unit 460 may determine a haptic output to provide in response to one or more detected inputs, and may control various components of the control system 450 and/or the in-bed haptic device 400 (e.g., valves, pumps, etc.) to provide the haptic output.

In some cases, the input devices include one or more force sensing mechanisms for detecting input signals for use in providing haptic outputs. The force sensing mechanisms may be capable of detecting whether a user is in bed, a positioning of the user in bed, heart information, breathing information, and the like. The force sensing mechanisms may include capacitive sensing mechanisms, piezoelectric sensing mechanisms, and the like. In some cases, the input devices include one or more contact sensing mechanisms (e.g., touch and/or proximity sensing mechanisms) for detecting input signals for use in providing haptic outputs. The contact sensing mechanism may be capable of detecting whether a user is in bed, for example by detecting that the user is contacting the bed and/or the in-bed haptic device 400. The contact sensing mechanism may additionally be capable of detecting a positioning of the user in bed, (e.g., whether the user is sleeping on his or her back, side, or stomach, a relative positioning of the user in the bed, or the like). The contact sensing mechanisms and/or force sensing mechanisms may use mutual-capacitive sensing techniques and/or self-capacitive sensing techniques. The contact sensing mechanisms and/or force sensing mechanisms may include a substrate and capacitive, piezoelectric and/or other sensing mechanisms that include one or more electrodes for determining whether a user is in contact with, proximate to, and/or exerting a force on the in-bed haptic device 400 or another device.

In some cases, the input devices include a microphone for detecting audio inputs. In some cases, the audio inputs may be used to detect snoring or other audio data as the in-bed haptic device 400 is used.

The inputs received by the processing unit 460 may be used to determine triggers for providing haptic outputs. Triggers may indicate that a haptic output is to be produced and/or characteristics of the haptic output, and are discussed in more detail with respect to FIG. 5. In response to detecting or determining one or more triggers, the processing unit 460 may determine one or more haptic outputs to be provided and cause the control system 450 and/or the in-bed haptic device 400 to provide the haptic output(s).

Figure 5:
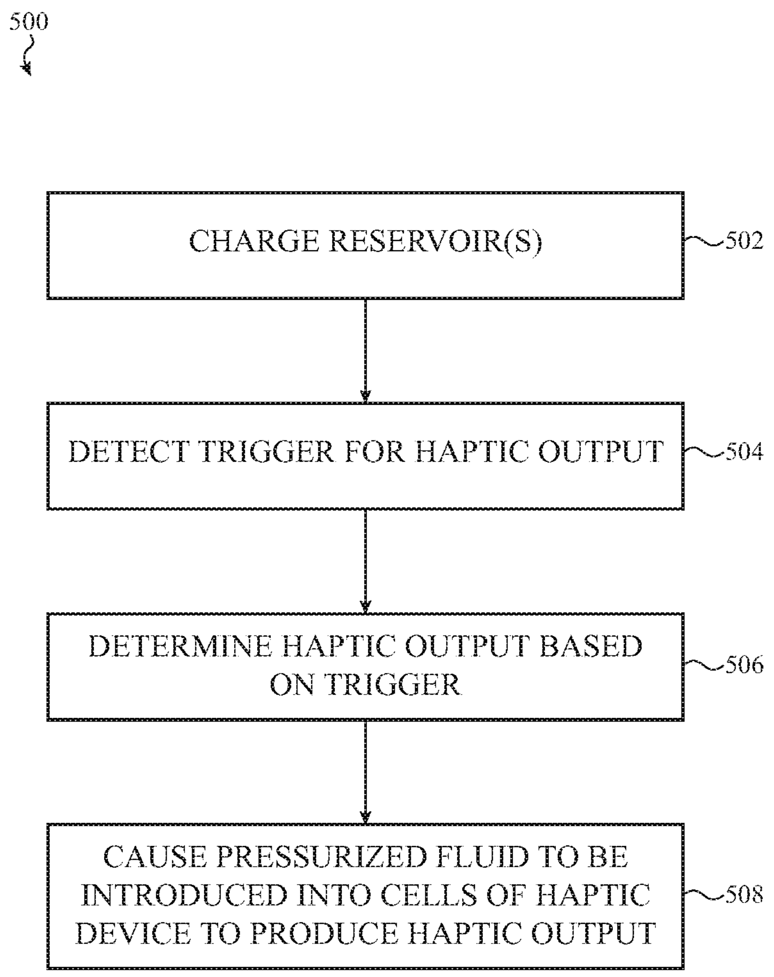
FIG. 5 shows a flowchart of an example method for providing a haptic output using an in-bed haptic device.

FIG. 5 shows a flowchart of an example method 500 for providing a haptic output using an in-bed haptic device. At block 502, a pump (e.g., pumps 458*a*, 458*b*) charges (e.g., pressurizes or depressurizes) air or another fluid within one or more reservoirs (e.g., reservoirs 454, 456). For example, as discussed above, in some cases, a control system (e.g., control system 450) includes a high pressure reservoir containing pressurized air and a vacuum reservoir containing depressurized air. In some cases, a processing unit (e.g., processing unit 460) causes the pump to charge the reservoirs. As noted above, charging the reservoirs may allow more rapid and more frequent inflation and/or deflation of actuation cells used to provide haptic outputs.

At block 504, the processing unit detects a trigger indicating that a haptic output should be produced using the in-bed haptic device. Triggers may include user conditions that indicate whether a user is asleep or awake, present or not present, snoring or not snoring, and the like. User conditions may be determined by analyzing signals from input devices (e.g., contact sensors, force sensors, audio sensors, biometric sensors, images sensors, light sensors, and the like). For example, the processing unit may determine user conditions by determining breathing information (e.g., instantaneous breathing rate, average breathing rate, maximum breathing rate, minimum breathing rate), user movement or presence information, heart information (e.g., instantaneous heart rate, average heart rate, maximum heart rate, minimum heart rate) determined from contact sensors, force sensors, audio sensors, biometric sensors, images sensors, light sensors, and the like. Triggers may also include raw inputs received from the in-bed haptic device and/or other devices, outputs provided by a device (e.g., audio outputs, video outputs, haptic outputs, alerts or alarms, and the like), and other conditions (e.g., time of day, temperature, humidity, weather, and other environmental conditions). In some cases, the processing unit may determine whether a received input or determined trigger exceeds a threshold level. In some cases, the method only proceeds if the input or trigger exceeds the threshold level.

At block 506, the processing unit determines a haptic output to produce. In response to detecting or determining one or more triggers, the processing unit may determine one or more haptic outputs to be provided. For example, the processing unit may determine a pattern, predetermined sequence, or the like associated with the haptic output. In some cases, haptic output is determined in response to detecting the trigger at block 504. In some cases, the haptic output corresponds to one or more characteristics of an input detected by an input device.

In some cases, determining the haptic output may include determining an amount of haptic feedback to be produced (e.g., a magnitude of the haptic output, a length of haptic output, or the like). The processing unit may determine an amount of the haptic feedback to be produced based, at least in part, on a characteristic of an input detected by the input device.

At block 508, the processing unit causes pressurized fluid (e.g., air) to be introduced into one or more actuation cells of the in-bed haptic device to produce the haptic output. As noted above, the pressurized air may be introduced into the one or more actuation cells according to a predetermined sequence. In some cases, providing the haptic output include deflating one or more actuation cells (e.g., removing the fluid from the actuation cells). For example, an actuation cell may inflate (partially or fully) to provide a first portion of a haptic output and may deflate (partially or fully) to provide a second portion of a haptic output. In addition, an actuation cell may remain static (e.g., deflated, partially inflated, or fully inflated) during a haptic output (e.g., between inflation or deflation or while one or more other actuation cells inflate or deflate).

As noted above, causing the pressurized fluid to be introduced into and/or removed from the actuation cell(s) may include opening and/or closing one or more valves of a valve array to control a fluid coupling between a reservoir of the control system and one or more bladders of an actuation cell. The processing unit of the control system may cause a valve between a bladder of an actuation cell and the high pressure reservoir to open to inflate the bladder. Similarly, the control system may cause a valve between a bladder of an actuation cell and the vacuum reservoir to deflate the bladder.

Using the reservoirs for inflating and/or deflating the bladders of individual actuation cells of the in-bed haptic device may allow the individual cells to be inflated and/or deflated more rapidly than using pumps to inflate and/or deflate the bladders. The pumps of the control system 450 can pressurize or depressurize the reservoirs over a long period of time in advance of providing haptic outputs to "charge" the reservoirs so that more rapid pressure changes may occur. In addition, using the reservoirs for inflating and/or deflating the bladders of the in-bed haptic device may reduce potential disturbances (e.g., sound, vibration, and the like) that would be created by using a pump for inflation and/or deflation. For example, the pumps of the control system can pressurize or depressurize the reservoirs before use of the in-bed haptic device (e.g., while a user is not present), thereby minimizing disturbances to users.

Figure 6A:
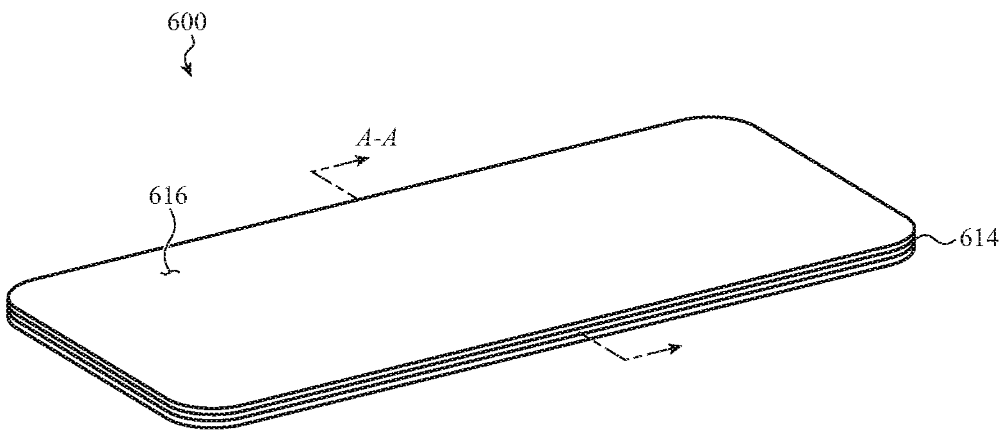
FIGS. 6A-6G show an example in-bed haptic device.

FIG. 6A shows an example in-bed haptic device 600. The in-bed haptic device 600 may be similar to the in-bed haptic devices discussed herein (e.g., in-bed haptic devices 100, 400) and may include similar structure and/or functionality. The in-bed haptic device 600 may include an enclosure 614 that defines a top external surface 616 at which haptic outputs may be provided.

Figure 6B:
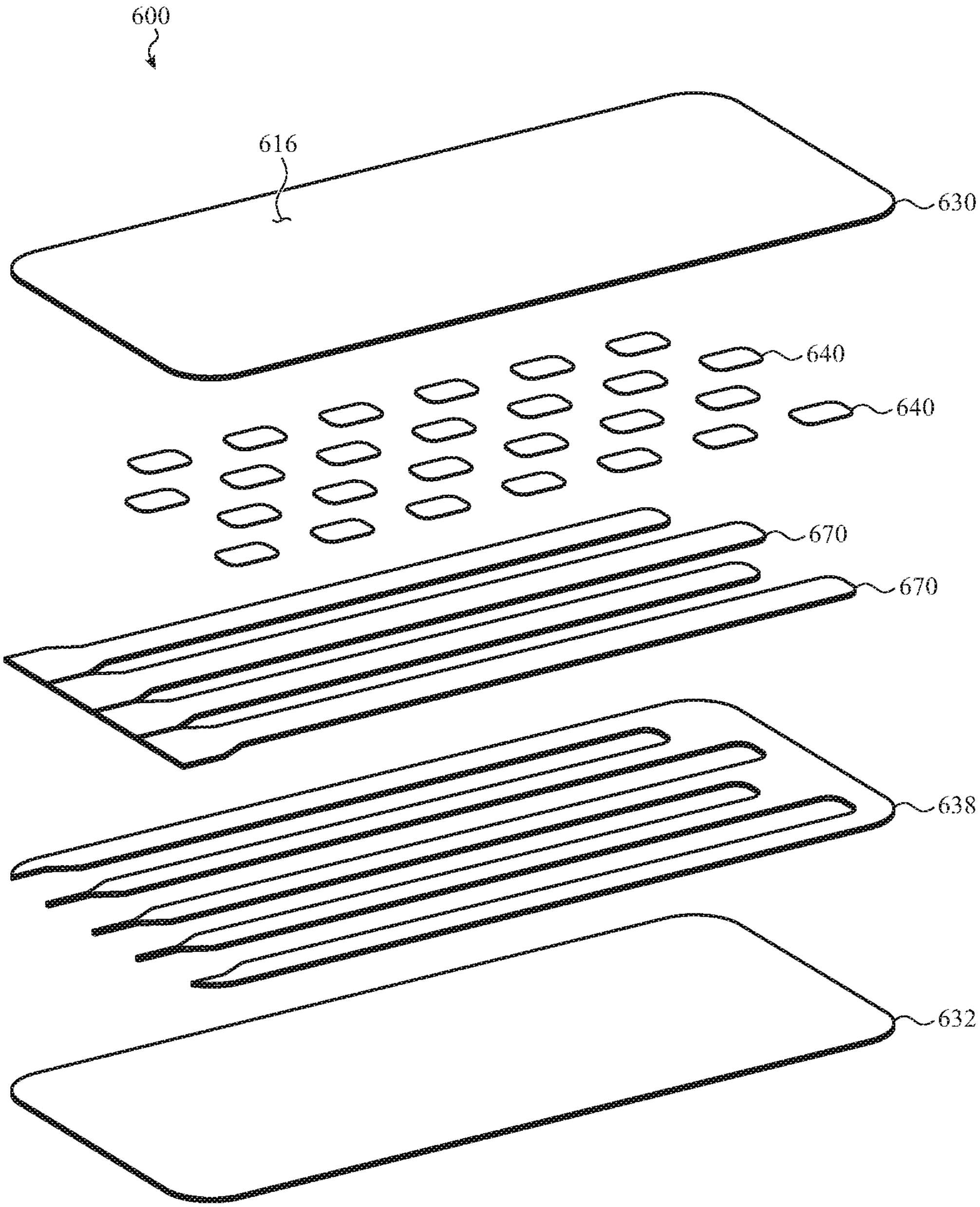

FIG. 6B shows an exploded view of the example in-bed haptic device 600 of FIG. 6A. The in-bed haptic device 600 may include a top layer 630 that defines the top external surface 616 and a bottom layer 632 that defines a bottom external surface of the in-bed haptic device 600. The top layer 630 and the bottom layer 632 may cooperate to define at least a portion of the enclosure 614. The top layer 630 may be formed of any suitable flexible material(s) that is capable of being deformed and/or displaced to provide haptic outputs. In some cases, the top layer 630 is formed of a flexible fabric (e.g., a woven fabric including one or more of nylon, polyester, cotton, or the like). In other cases, the layer 630 may be formed of any suitable material(s), including flexible polymers (e.g., polyurethane, PVC, polyethylene, polyimide, cellulose, etc.), rubbers, synthetic rubbers, fiber reinforced materials, composite materials, and the like.

In some cases, the bottom layer 632 is configured to be positioned above and facing a top surface of a mattress. The bottom layer 632 may be formed of a material or combination of materials that allows the bottom external surface of the in-bed haptic device 600 to adhere or grip a surface upon which it is placed (e.g., a mattress, a bedsheet, a bed, a mattress protector, or another surface). The bottom layer 632 may be formed of a gripping material(s), such as thermoplastic polyurethane. The bottom layer 632 may be formed of any suitable material(s), including fabrics, flexible polymers (e.g., polyurethane, PVC, polyethylene, polyimide, cellulose, etc.), rubbers, synthetic rubbers, fiber reinforced materials, composite materials, and the like. In some cases, the top layer 630 has a stiffness that is less than a stiffness of the bottom layer 632. This may allow the actuation of the actuation cells to deform and/or displace the top layer 630 more than the bottom layer 632 to improve the haptic outputs provided by the in-bed haptic device 600.

The in-bed haptic device 600 may include an array of actuation cells (e.g., bladders 640) positioned between the top layer 630 and the bottom layer 632. The bladders 640 may be configured to inflate and/or deflate to deform and/or displace the top external surface 616 to provide haptic outputs. The bladders 640 are discussed in more detail below with respect to FIG. 6C.

The in-bed haptic device 600 may include passage members 670 positioned beneath the bladders 640. Each passage member 670 may define one or more passages that fluidly couple the bladders 640 to one or more connectors and/or one or more reservoirs of a control system. As shown in FIG. 6B, each passage member 670 may correspond to a row of bladders 640 in the array of actuation cells. Each passage member 670 may define one or more passages that separately fluidly couple each bladder 640 of the row to which the passage member 670 corresponds. The passage members 670 are discussed in more detail below with respect to FIG. 6D.

The in-bed haptic device 600 may include an adhesive layer 638 positioned between the top layer 630 and the bottom layer 632. In some cases, the adhesive layer 638 adheres the top layer 630 to the bottom layer 632 to attach the components of the in-bed haptic device 600 together and form the enclosure 614. In some cases, the adhesive layer 638 and the passage members 670 are positioned in a single layer. For example, the adhesive layer 638 may at least partially surround one or more passage members 670. In some cases, the adhesive layer 638 is positioned in spaces between two or more passage member 670. The adhesive layer 638 may be formed of any suitable type of material(s), including thermoplastic adhesives, pressure-sensitive adhesives, reactive film adhesives, heat-activated films, and the like.

Figure 6C:
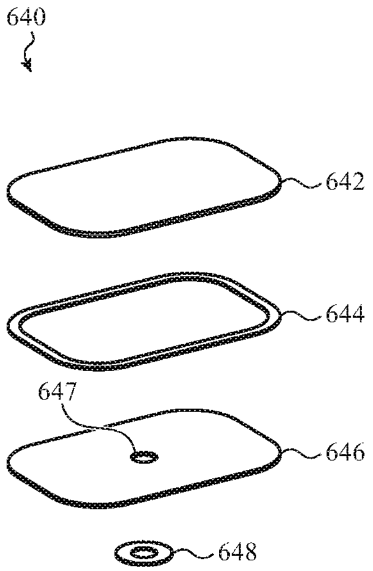

FIG. 6C is an exploded view of an example bladder 640 of FIG. 6B. The bladder 640 may include a top sheet 642, a bottom sheet 646, and an adhesive ring 644 attaching the top sheet 642 and the bottom sheet 646 to define an interior volume. The bottom sheet 646 may include an opening 647 for fluidly coupling the interior volume with a passage of a passage member 670. The bottom sheet 646 may be attached to a passage member 670 using an adhesive ring 648 positioned around the opening 647. The top sheet 642 and bottom sheet 626 may be formed of any suitable material(s), including fabrics, flexible polymers (e.g., polyurethane, PVC, polyethylene, polyimide, cellulose, etc.), rubbers, synthetic rubbers, fiber reinforced materials, composite materials, and the like. The adhesive rings 644 and 648 may be formed of any suitable type of material(s), including thermoplastic adhesives, pressure-sensitive adhesives, reactive film adhesives, heat-activated films, and the like.

Figure 6D:
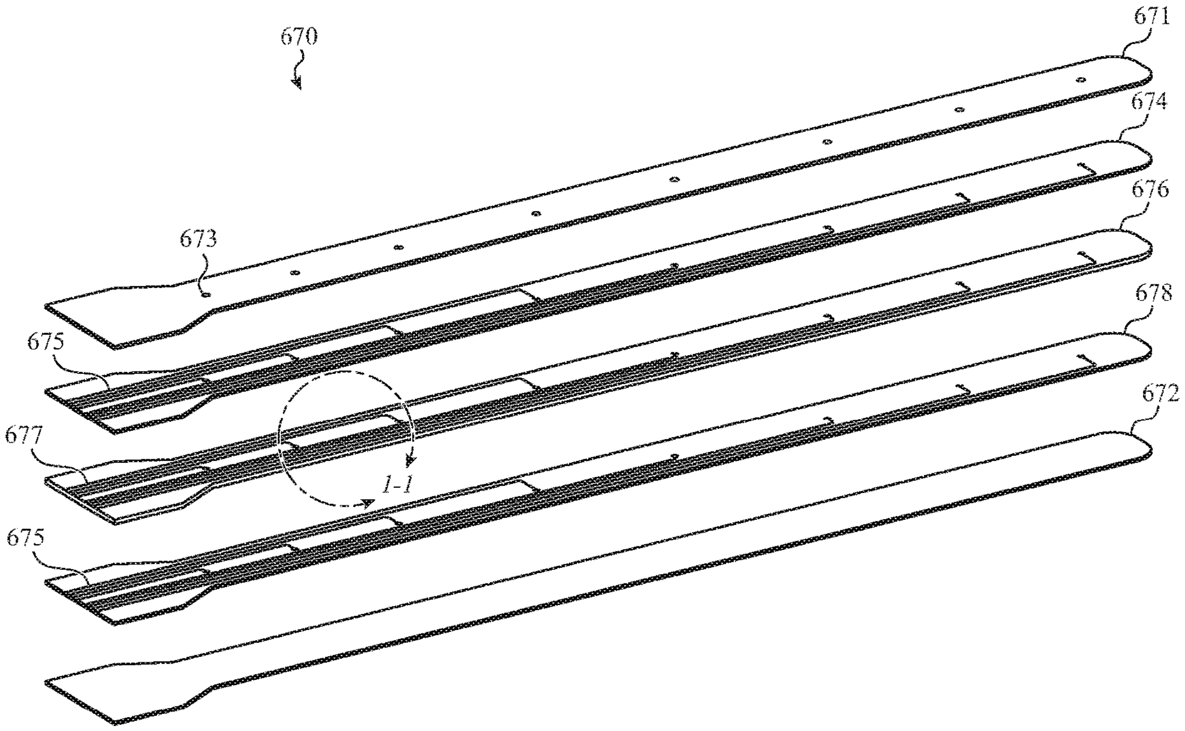

FIG. 6D is an exploded view of an example passage member 670 of FIG. 6B. The passage member 670 may include a top sheet 671, a bottom sheet 672, and a channel member 676 positioned between the top sheet and the bottom sheet. The passage member 670 may further include adhesive layers 674 and 678 that attach the top sheet 671 to the channel member 676 and the channel member to the bottom sheet 672, respectively. The channel member 676 may cooperate with the top sheet 671, the bottom sheet 672, and/or the adhesive layers 674, 678 to define passages extending from openings 673 defined in the top sheet 671 and an end of the passage member 670. The openings 673 may fluidly couple the passages to bladders 640 (e.g., via openings 647 of the bladders), and the passages may be used to fluidly couple the bladders 640 to a connector, a reservoir, or the like, for providing haptic outputs using the bladders. The end of the passage member 670 may be connected to a connector to fluidly couple the bladders 640 to a control system.

Figure 6E:
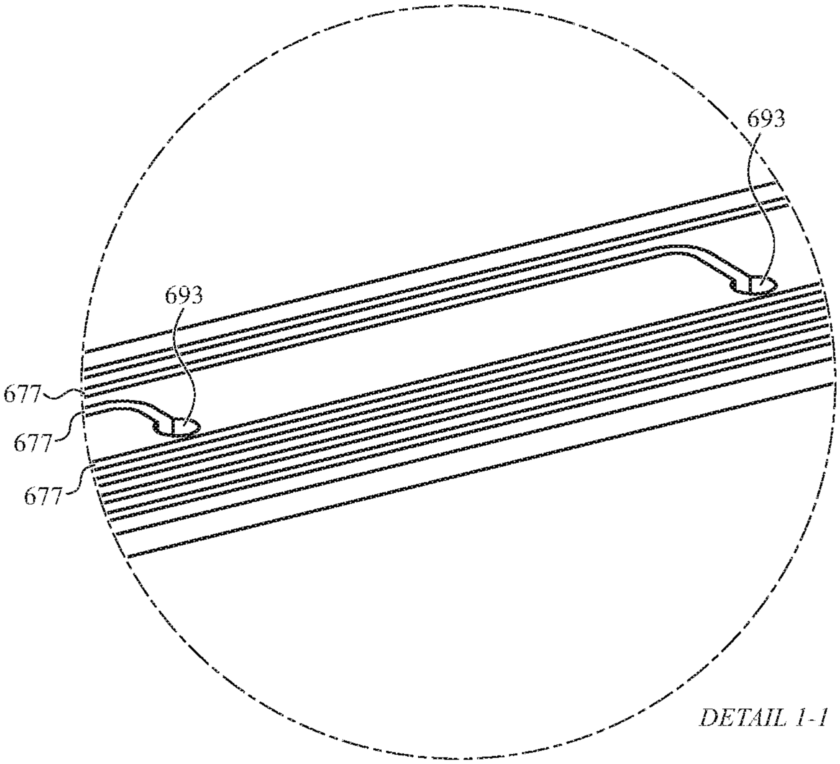

The channel member 676 may include one or more channels 677 extending from an end of the channel member 676 to positions that correspond to the openings 673. FIG. 6E shows a detail view of section 1-1 of FIG. 6D, showing channels 677. The channels 677 may include portions 693 that correspond to the openings 673. Each portion 693 of each channel 677 may align with an opening 673 to fluidly couple one or more bladders 640 to the channel 677. The channels 677 may define sidewalls of each passage, the top sheet 671 may define a top wall of each passage, and the bottom sheet 672 may define a bottom wall of each passage.

In some cases, as shown in FIG. 6D, the adhesive layers 674, 678 may include channels 675 that correspond to the channels 677 of the channel member 676. These channels may prevent the adhesive layers 674, 678 from causing the passages to be blocked. The channel member 676, the top sheet 671 and bottom sheet 672 may be formed of any suitable material(s), including fabrics, flexible polymers (e.g., polyurethane, PVC, polyethylene, polyimide, cellulose, etc.), rubbers, synthetic rubbers, fiber reinforced materials, composite materials, and the like. In some cases, the channel member 676 is formed from thermoplastic polyurethane. The adhesive layers 674, 678 may be formed of any suitable type of material(s), including thermoplastic adhesives, pressure-sensitive adhesives, reactive film adhesives, heat-activated films, and the like.

Figure 6F:
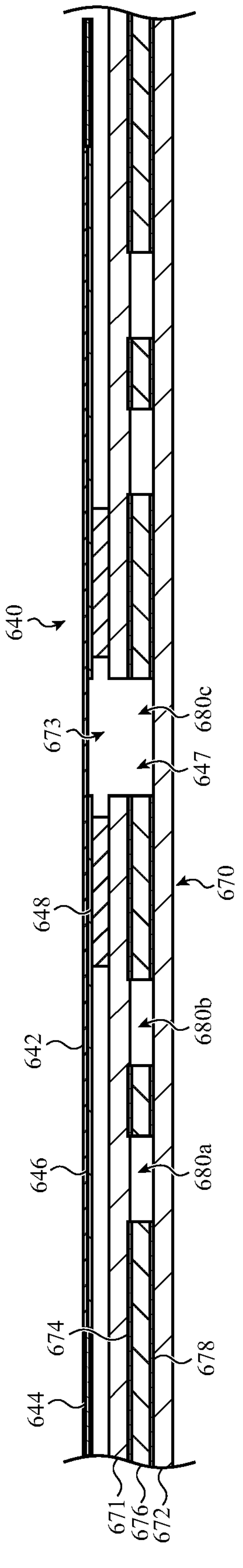
Figure 6G:
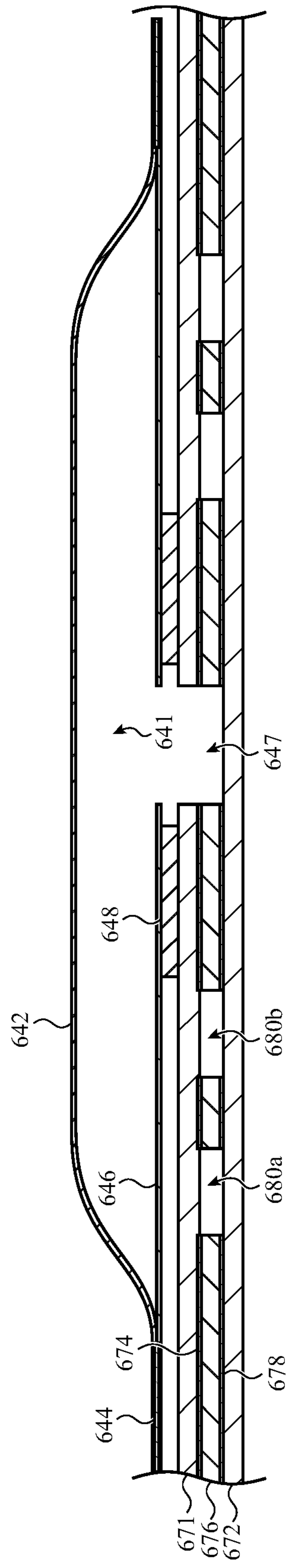

FIG. 6F shows a partial cross-section view of a bladder 640 and a passage member 670, taken through section line A-A of FIG. 6A. As shown in FIG. 6F, the passage member 670 defines passages 680*a*, 680*b*, and 680*c*. The passage 680*c* fluidly couples the bladder 640 to a control system for providing haptic outputs using the bladder 640. FIG. 6F shows the bladder 640 in a collapsed or uninflated state. FIG. 6G shows the bladder 640 in an inflated state, for example after pressurized air has been introduced to the interior volume 641 of the bladder 640.

In some cases, the channels (e.g., channels 677) may be configured to at least partially control the flow of fluid to one or more bladders. For example, the channels may have a cross-sectional area that decreases along a length of the channel. This may limit the flow of fluid and cause bladders along the length of the in-bed haptic device to inflate at different times and/or rates. For example, a first bladder may be located closer to a first end of the in-bed haptic device, and a first channel fluidly coupled to the bladder may have a first cross-sectional area at the location of the first bladder. A second bladder may be located farther from the first end of the in-bed haptic device, and a second channel fluidly coupled to the bladder may have a second cross-sectional area less than the first cross-sectional area at the location of the second bladder. The smaller cross-sectional area of the second channel at the location of the second bladder may cause the second bladder to inflate at a slower rate and/or at a later time than the first bladder. This may be used to provide a haptic output that varies depending on the location along the surface of the in-bed haptic device, such as the wave described with respect to FIGS. 3A-3C.

In some cases, each bladder may be coupled to two (or more) channels. A cross-sectional area of a first channel fluidly coupled to a bladder may increase in a first direction along the length of the channel, and a cross-sectional area of a second channel fluidly coupled to the bladder may decrease in the first direction. In this manner, the wave or similar haptic output provided using the bladders may be provided in a bi-directional manner depending on which channels are used to introduce fluid to the bladders.

In some cases, multiple channels may be fluidly coupled to a single bladder or multiple bladders. In some cases, a first set of bladders associated with a first waveform of haptic output may be connected to a first common channel, and a second set of bladders associated with a second waveform of haptic output may be connected to a second common channel. In this manner, the first waveform and/or the second waveform may be provided based on whether fluid is introduced into the first common channel and/or the second common channel without the need for complex valve control to individually control each bladder in the set.

Figure 7A:
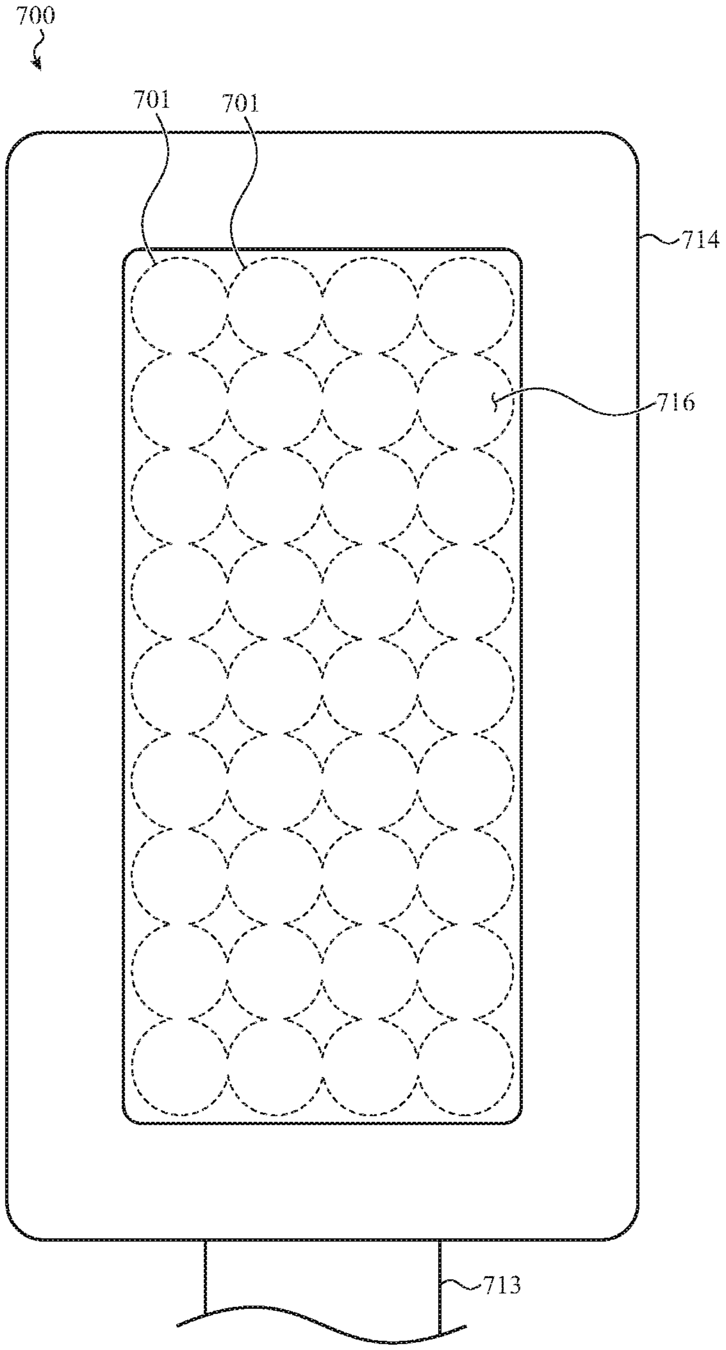
FIGS. 7A-7E show an example in-bed haptic device.

FIG. 7A shows an example in-bed haptic device 700. The in-bed haptic device 700 may be similar to the in-bed haptic devices discussed herein (e.g., in-bed haptic devices 100, 400, 600) and may include similar structure and/or functionality. The in-bed haptic device 700 may include an enclosure 714 that defines a top external surface 716 at which haptic outputs may be provided. The in-bed haptic device 700 may include an array of actuation cells 701 (shown in phantom in FIG. 7A) positioned beneath the top external surface 716. As described herein, the actuation cells 701 may be configured to inflate and/or deflate to deform and/or displace the top external surface 716 to provide haptic outputs. The in-bed haptic device 700 may include a connection interface 713 that fluidly couples the actuation cells 701 to one or more additional connectors and/or a control system, such as described herein.

Figure 7B:
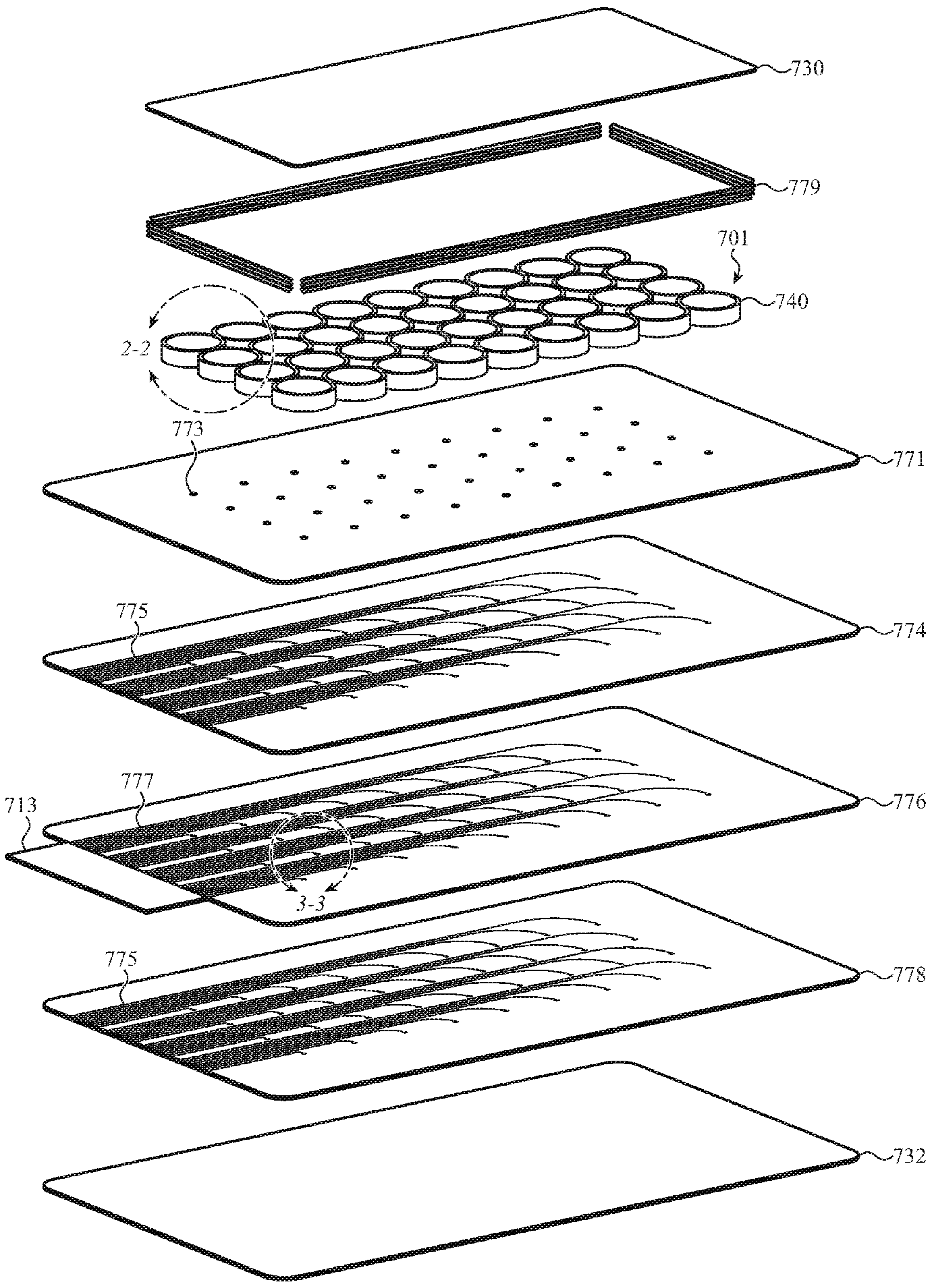
Figure 7C:
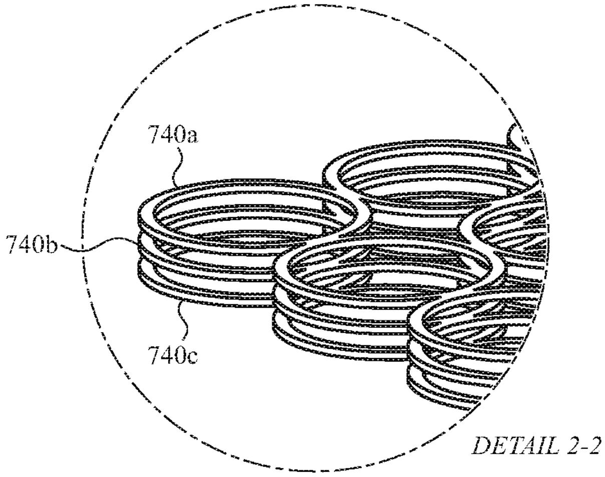
Figure 7D:
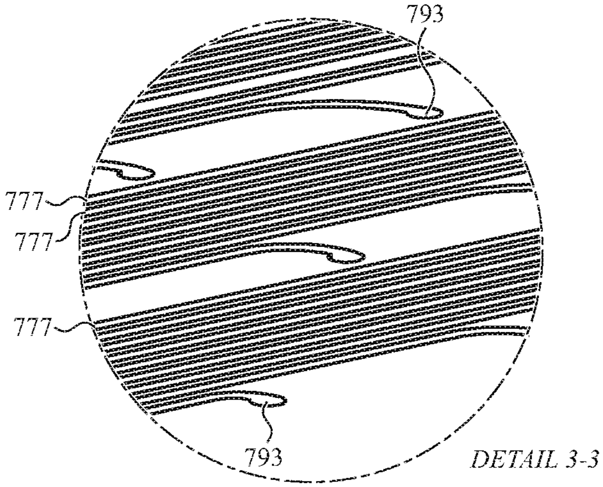

FIG. 7B shows an exploded view of the example in-bed haptic device 700 of FIG. 7A. The in-bed haptic device may include an array of bladders 740 that make up the actuation cells 701. In some cases, each actuation cell 701 includes multiple bladders 740 in a stack. For example, three bladders 740 may be stacked to form an actuation cell 701. FIG. 7C shows a detail view of section 2-2 of FIG. 7B, showing three bladders 740*a*, 740*b*, 740*c* stacked on top of one another. Including multiple bladders in each actuation cell 701 may increase an amount that the actuation cell can deform and/or displace the top surface 716. The bladders 740 are discussed in more detail below with respect to FIG. 7E.

The in-bed haptic device 700 may include a top layer 730 that defines at least a portion of the top external surface 716 and a bottom layer 732 that defines a bottom external surface of the in-bed haptic device 700. The in-bed haptic device 700 may further include a secondary layer 771 that defines a portion of the top external surface 716. In some cases, the secondary layer has a larger surface area than the top layer 730, as shown in FIG. 7B. The in-bed haptic device 700 may include one or more actuation components 779 that attach the top layer 730 to the secondary layer 771. In some cases, the actuation components 779 are flexible and configured to allow the top layer 730 to move relative to the secondary layer 771. In some cases, the actuation components 779 are configured to at least partially surround the actuation cells 701 to prevent contaminants from coming into contact with the actuation cells and/or prevent other types of damage.

The top layer 730, the bottom layer 732, the secondary layer 771, and the actuation components 779 may cooperate to define at least a portion of the enclosure 714. The top layer 730 may be formed of any suitable flexible material(s) that is capable of being deformed and/or displaced to provide haptic outputs. In some cases, the top layer 730 is formed of a flexible fabric (e.g., a woven fabric including one or more of nylon, polyester, cotton, or the like). In other cases, the top layer 730 may be formed of any suitable material(s), including fabrics, flexible polymers (e.g., polyurethane, PVC, polyethylene, polyimide, cellulose, etc.), rubbers, synthetic rubbers, fiber reinforced materials, composite materials, and the like. The bottom layer 732 may be formed of a material or combination of materials that allows the bottom external surface of the in-bed haptic device 700 to adhere or grip a surface upon which it is placed (e.g., a mattress, a bedsheet, a bed, a mattress protector, or another surface). The bottom layer 732 may be formed of a gripping material(s), such as thermoplastic polyurethane. The bottom layer 732, the secondary layer 771, and the actuation components 779 may be formed of any suitable material(s), including fabrics, flexible polymers (e.g., polyurethane, PVC, polyethylene, polyimide, cellulose, etc.), rubbers, synthetic rubbers, fiber reinforced materials, composite materials, and the like.

The in-bed haptic device 700 may include a channel layer 776 positioned between the secondary layer 771 and the bottom layer 732. The in-bed haptic device 700 may further include adhesive layers 774 and 778 that attach the secondary sheet 771 to the channel layer 776 and the channel layer to the bottom sheet 772, respectively. The channel layer 776 may cooperate with the secondary sheet 771, the bottom sheet 772, and/or the adhesive layers 774, 778 to define passages extending from openings 773 defined in the secondary sheet 771 and the connection interface 713. The openings 773 may fluidly couple the passages to the actuation cells 701 (e.g., bladders 740 of the actuation cells), and the passages may be used to fluidly couple the actuation cells to a connector, a reservoir, or the like, for providing haptic outputs using the bladders.

The channel layer 776 may include one or more channels 777 extending from an end of the channel layer 776 (e.g., part of connection interface 713) to positions that correspond to the openings 773. FIG. 7C shows a detail view of section 2-2 of FIG. 7B, showing channels 777. The channels 777 may include portions 793 that correspond to the openings 773. Each portion 793 of each channel 777 may align with an opening 773 to fluidly couple an actuation cell 701 to the channel 777. In some cases, the channel layer 776 and one or more additional layers (e.g., the secondary sheet 771 and the bottom sheet 772) may form a passage member, such as the passage member 670 discussed above with respect to FIGS. 6A-6G. Sidewalls of the channels 777 may define sidewalls of each passage, the secondary sheet 771 may define a top wall of each passage, and the bottom sheet 772 may define a bottom wall of each passage.

In some cases, as shown in FIG. 7B, the adhesive layers 774, 778 may include channels 775 that correspond to the channels 777 of the channel layer 776. These channels may prevent the adhesive layers 774, 778 from causing the passages to be blocked. The channel layer 776, the top may be formed of any suitable material(s), including flexible polymers (e.g., polyurethane, PVC, polyethylene, polyimide, cellulose, etc.), rubbers, synthetic rubbers, fiber reinforced materials, composite materials, and the like. In some cases, the channel layer 776 is formed from thermoplastic polyurethane. The adhesive layers 774, 778 may be formed of any suitable type of material(s), including thermoplastic adhesives, pressure-sensitive adhesives, reactive film adhesives, heat-activated films, and the like.

Figure 7E:
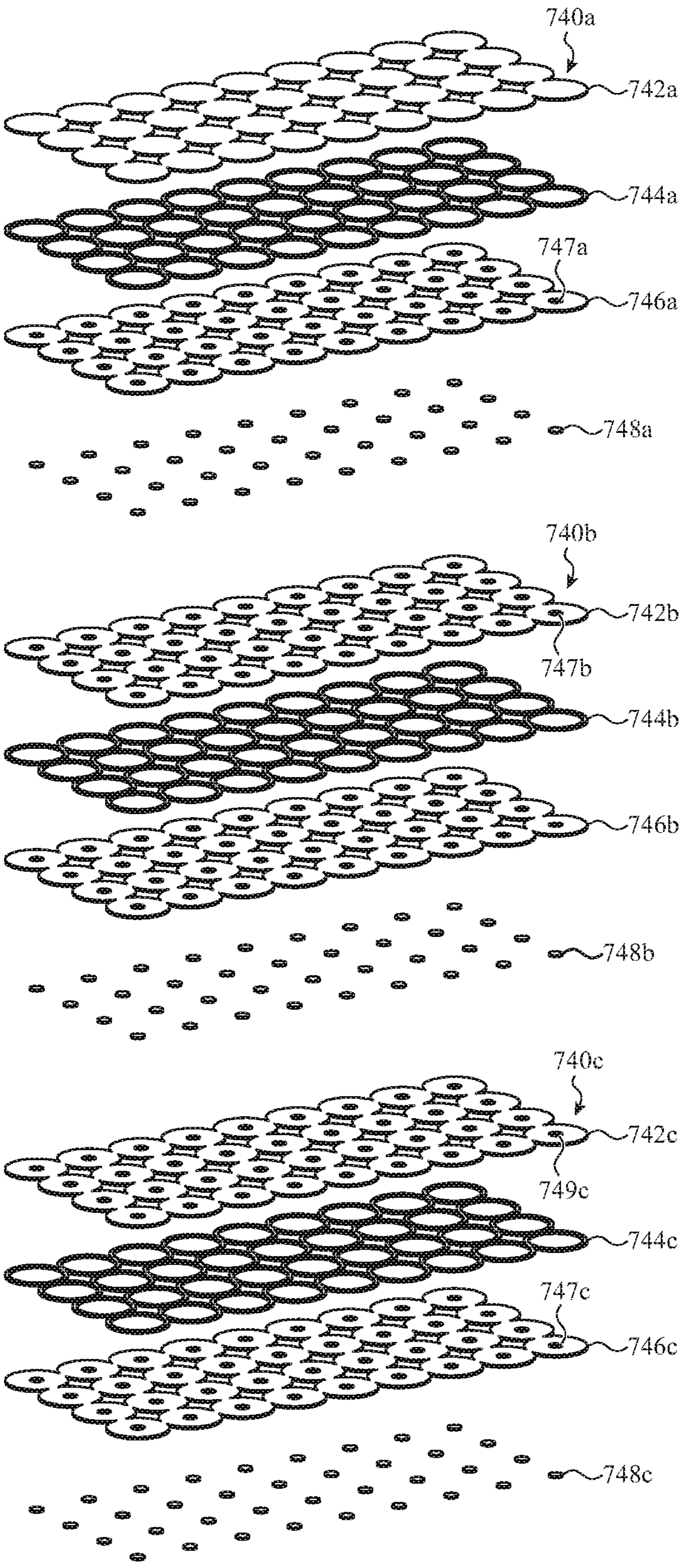

FIG. 7E illustrates an exploded view of the array of actuation cells 701 of FIG. 7B. As described with respect to FIG. 7C, each actuation cell 701 includes three bladders 740*a*, 740*b*, 740*c* stacked on top of one another. Including multiple bladders in each actuation cell 701 may increase an amount that the actuation cell can deform and/or displace the top surface 716. Each bladder 740*a*, 740*b*, 740*c* includes a top member 742*a*, 742*b*, 742*c*, a bottom member 746*a*, 746*b*, 746*c*, and an adhesive ring 744*a*, 744*b*, 744*c* attaching the top member to the bottom member. Each bladder may include one or more openings for fluidly coupling the bladder to other bladders in the actuation cell and/or passages of the in-bed haptic device. For example, each bladder 740*a* may include an opening 747*a* in the bottom member 746*a* for fluidly coupling the bladder 740*a* to the bladder 740*b* of the same actuation cell 701. Each bladder 740*b* may include an opening 749*b* in the top member 742*b* that is aligned with the opening 747*a* for fluidly coupling the bladder 740*b* to the bladder 740*a* of the same actuation cell 701. Each bladder 740*b* may further include an opening 747*b* in the bottom member 746*b* for fluidly coupling the bladder 740*b* to the bladder 740*c* of the same actuation cell 701. Each bladder 740*c* may include an opening 749*c* in the top member 742*c* that is aligned with the opening 747*b* for fluidly coupling the bladder 740*c* to the bladder 740*b* of the same actuation cell 701. Each bladder 740*c* may further include an opening 747*c* in the bottom member 746*c* for fluidly coupling the bladder 740*c* to a passage in the in-bed haptic device 700.

Each actuation cell 701 may further include an adhesive ring 748*a* (similar to the adhesive ring 648 discussed with respect to FIG. 6C) positioned between and attaching bladder 740*a* and bladder 740*b*. The adhesive ring 748*a* may be positioned around the opening 747*a* and the opening 749*b*. Each actuation cell 701 may further include an adhesive ring 748*b* positioned between and attaching bladder 740*b* and bladder 740*c*. The adhesive ring 748*a* may be positioned around the opening 747*b* and the opening 749*c*. Each actuation cell 701 may further include adhesive ring 748*c* positioned beneath the bladder 740*c* and configured to attach the actuation cell to the secondary sheet 771. The adhesive ring 748*c* may be positioned around the opening 747*c* and the opening 773 of the secondary sheet 771.

As shown in FIG. 7C, the components for multiple actuation cells 701 may be combined into and/or formed from a single sheet or component of material. For example, the top members 742*a*, 742*b*, 742*c*, the bottom members 746*a*, 746*b*, 746*c*, and the adhesive rings 744*a*, 744*b*, 744*c* for multiple actuation cells 701 in the array of actuation cells may be formed from a single sheet. This may simplify manufacturing by reducing the overall number of components used to form the in-bed haptic device 700.

As noted above, the in-bed haptic devices described herein may include a connection interface (e.g., connection interface 713) for coupling the passages of the in-bed haptic device to connectors and/or a control system. FIGS. 8A-9B illustrate example connection interfaces.

Figure 8A:
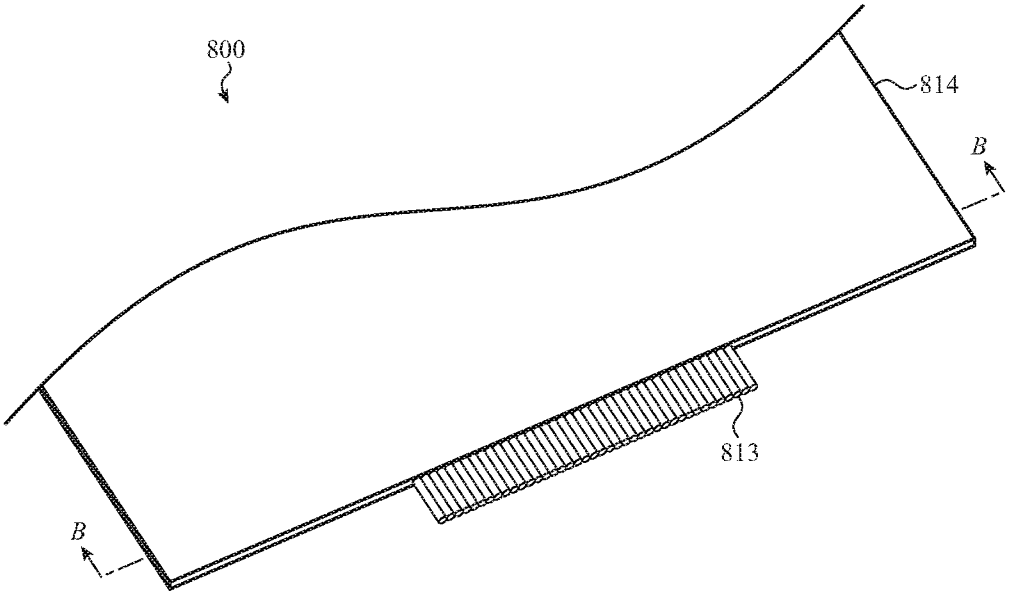
FIGS. 8A-8B illustrate an example connection interface that includes multiple tubular members that are fluidly coupled to individual passages of an in-bed haptic device.
Figure 8B:
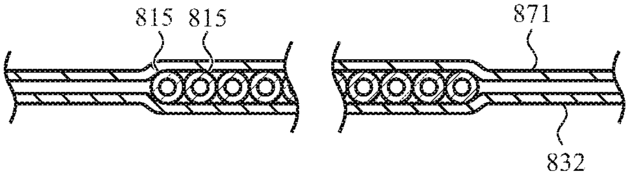

FIG. 8A illustrates an example connection interface 813 that includes multiple tubular members that are fluidly coupled to individual passages of an in-bed haptic device 800. The in-bed haptic device 800 may be similar to the haptic devices described herein, and may include similar structure and/or functionality. FIG. 8B illustrates a cross-section view of the in-bed haptic device 800, taken through section line B-B of FIG. 8A. As shown in FIG. 8B, the tubular members 815 are positioned between a first layer 871 and a second layer 832 of the haptic device 800. As shown in FIG. 8A, in some cases, the tubular members 815 may extend from the enclosure 814 of the haptic device 800. The tubular members 815 may be sealed. For example, the tubular members 815 may be at least partially encapsulated by a cured adhesive or filler that fills the gaps or voids around the tubular members.

Figure 9A:
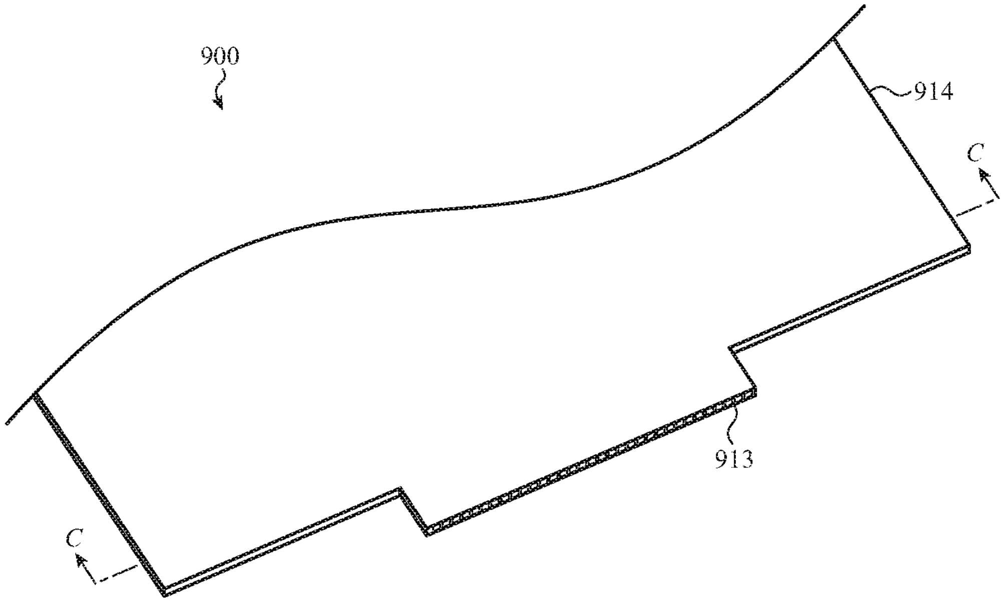
FIGS. 9A-9B illustrate an example connection interface in which passages defined in the in-bed haptic device are extended to form the connection interface.
Figure 9B:
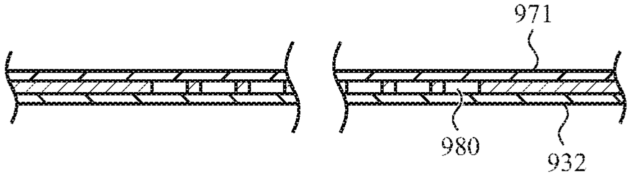

FIG. 9A illustrates an example connection interface 913 in which passages defined in the in-bed haptic device 900 are extended to form the connection interface 913. The in-bed haptic device 900 may be similar to the haptic devices described herein, and may include similar structure and/or functionality. FIG. 9B illustrates a cross-section view of the in-bed haptic device 900, taken through section line C-C of FIG. 9A. As shown in FIG. 9B, the passages 980 are positioned between a first layer 971 and a second layer 932 of the haptic device 900.

Figure 10A:
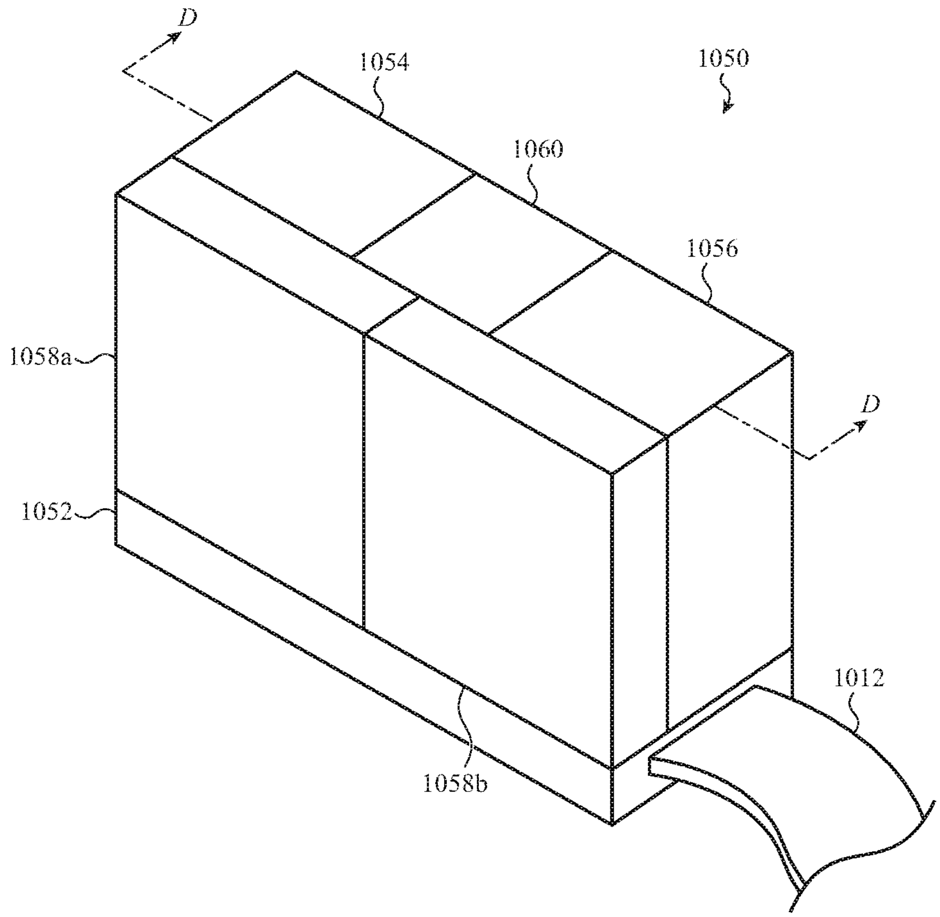
FIGS. 10A-10B illustrate an example arrangement of example components of a control system.
Figure 10B:
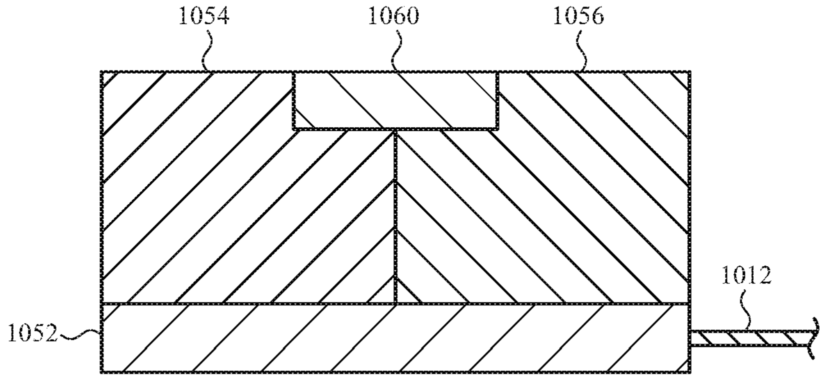

As noted above, the in-bed haptic devices discussed herein may be fluidly coupled to a control system that is configured to introduce pressurized air into the bladders of the array of actuation cells and/or remove pressurized air from the bladders of the array of actuation cells to provide haptic outputs. FIGS. 10A-10B illustrate an example arrangement of example components of a control system module 1050. The control system module 1050 may be similar to the control systems described herein, and may include similar structure and/or functionality. The components of the control system module 1050 may be arranged in a compact package to reduce an overall size of the control system, which may improve a user experience. The control system module 1050 includes pumps 1058*a*, 1058*b*, reservoirs 1054, 1056, a valve array 1052, a processing unit 1060, and a connector 1012. FIG. 10B shows a cross-section of the example control system 1050, taken through section line D-D of FIG. 10A. As shown in FIG. 10B, the reservoirs 1054, 1056 may cooperate to define a recess, and the processing unit 1060 may be positioned at least partially within the recess.

In some cases, multiple control system modules 1050 may be combined to form a control system. For example, the control system module 1050 may be stacked or otherwise arranged with one or more additional control system modules to expand the capacity of the system and/or expand the number of actuation cells that can be actuated using the control system.

Figure 11:
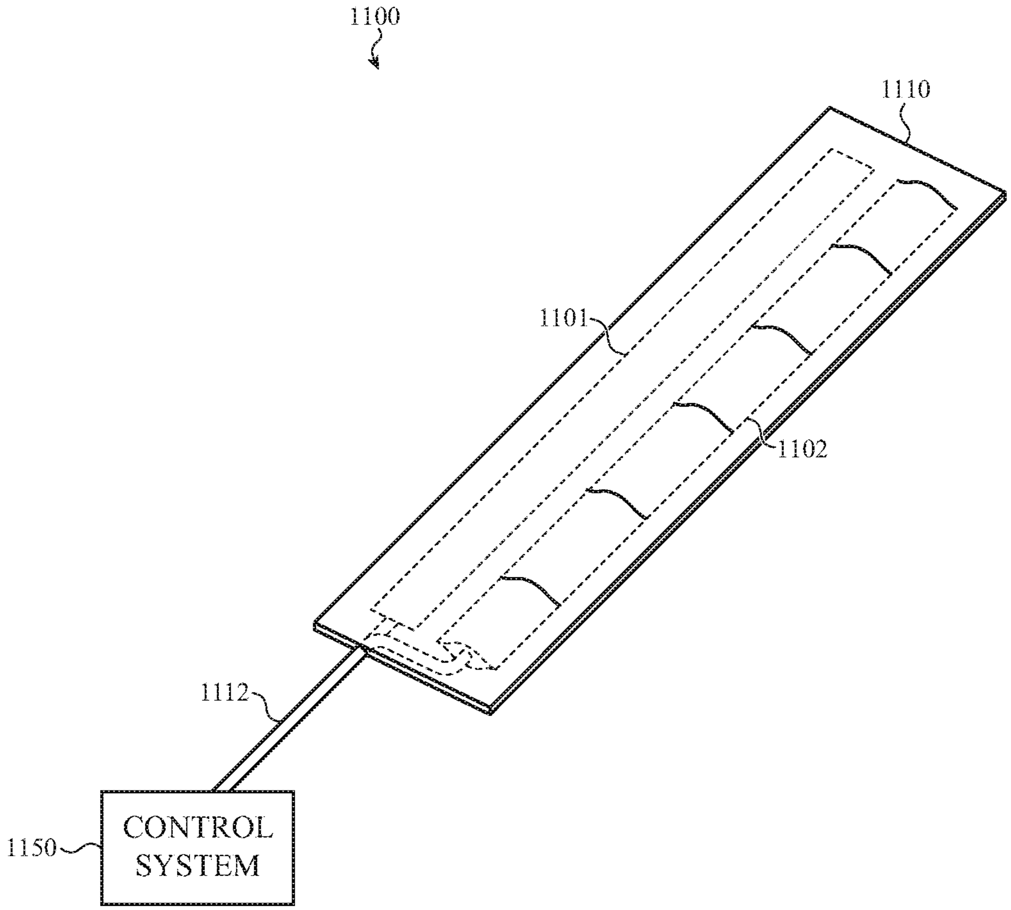
FIG. 11 shows an example of an in-bed haptic device and control system.

FIG. 11 shows an example of in-bed haptic device 1100 and control system 1150. The in-bed haptic device 1100 can include an electronic sensor strip 1101 and an actuation cell 1102 (shown in phantom in FIG. 11) that are configured to actuate (e.g., expand, contract, or otherwise change shape) to provide haptic outputs. The in-bed haptic device 1100 may include an enclosure 1110 or other external layer that at least partially surrounds the sensor strip 1101 and/or the actuation cells 1102 and/or other components of the in-bed haptic device 1100. The enclosure 1110 may contain and/or protect the sensor strip 1101 and/or the actuation cells 1102 and/or other components of the in-bed haptic device 1100. In some cases, the enclosure 1110 is flexible. One or more surfaces of the enclosure 1110 may include an adhesive or a high-friction material(s) configured to maintain the in-bed haptic device 1100 in place. The in-bed haptic device 1100 can also include one or more connectors 1112 that couple the control system 1150 and/or other system components such as fluid pump(s), valves, reservoirs, or the like to the enclosure 1110.

The sensor strip 1101 can include one or more sensors that are used to measure physiological parameters of a user that is positioned over the strip. In some embodiments, the sensor strip 1101 can be a piezoelectric sensor such as a differential piezo electric sensor that is operative to sense movement, respiration, heartbeat, or other physiological parameters of a user. In some embodiments, the sensor strip 1101 can include one or more temperature sensors that are positioned along the enclosure and are operative to detect a body temperature of a user. In further examples, the sensor strip 1101 can include capacitive sensors, strain sensors, accelerometers, or the like that are used to detect one or more parameters such as weight, position, posture, and/or movement of a user. In some cases, the sensor strip 1101 can include a combination of different types of sensors such as a combination of piezoelectric sensor, temperature sensors, capacitive sensors, strain based sensors, or the like. The sensor strip 1101 can include various sensors that are integrated into a single strip. In other cases the sensor strip 1101 can include multiple discrete sensors positioned at various locations within or on the enclosure 1110.

The actuation cell 1102 can also be integrated with the enclosure 1110. The actuation cell 1102 can include one or more sealed bladders that are configured to expand in response to pressurized air (or another gas or fluid) being introduced into the interior volume of the bladder, and/or deflate in response to pressurized air being removed from the interior volume of the bladder. In some cases, the actuation cell 1102 is configured to expand in a direction that is substantially transverse to the top external surface of a bed, thereby increasing a thickness of a region of the in-bed haptic device 100.

In some embodiments, the actuation cell 1102 can be operated to provide a haptic output to a user as described herein. In other cases, the actuation cell 1102 can be operated to sense one or more parameters of a user. For example, the actuation cell 1102 can be operated to measure presence of the user on the bed, movement of a user, posture or position of a user, number and/or location of different people (or animals) in a bed, physiological parameters such as heart rate, respiratory rate, or the like, or a combination thereof. To operate the actuation cell 1102 to measure one or more parameters of a user, the actuation cell 1102 can be partially inflated to maintain a positive air pressure within the bladder. Changes in air pressure within the bladder can be measured and used to determine the one or more parameters of a user. For example, one or more pressure sensors can be used to measure a fluid pressure with the bladder. In some cases, the pressure sensors can include resistive, capacitive, or other pressure measurement technologies. In some cases, the haptic device 1100 can include multiple actuation cells 1102 and pressures within each cell can be used to determine a parameter of a user. For example, internal pressures between different actuation cells 1102 can be compared to determine a location of a user on a bed. In other cases, the actuation cell 1102 can include multiple bladders that are fluidly coupled by one or more fluid passages. In these cases, the actuation cell 1102 can include multiple pressure sensors located at different ones of the bladders, and pressure measurements from the different sensors can be used to determine a parameter of a user. For example, comparing data from the multiple pressure sensors can be used to identify a pressure pulse traveling across the bladders, which may correspond to a heartbeat or other movements of a user.

The control system 1150 can be an example of the control systems described herein. The control system 1150 can include one or more pumps, reservoirs, valves array, a processing unit, pressure sensors, and the like. The control system 1150 can be coupled to the sensor strip 1101 and the actuation cell 1102 by one or more connectors 1112. In some cases, one or more of the pump(s), reservoir(s), valve(s), pressure sensor(s) and/or processing unit can be integrated into the enclosure 1110.

The connector 1112 can include a hybrid cable that integrates electrical power cables, signal lines, and fluid tubing (e.g., pneumatic or hydraulic tubing) to couple the control system 1150 to the sensor strip 1101 and actuation cells 1102. In some cases, the connector 1112 can include an outer housing that encloses the power cables, signal lines and pneumatic or hydraulic tubing. In some cases, the connector 1112 can include multiple power cables, signal lines and/or fluid tubing.

Figure 12A:
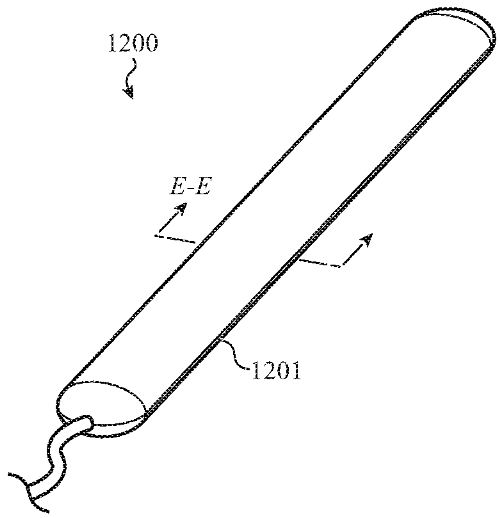
FIGS. 12A-12B illustrate examples of actuation cells that can be integrated into an in-bed device.

FIG. 12A shows an example of an actuation cell 1200 that can be integrated into the in-bed device as described herein. The actuation cell 1200 can include a bladder that defines a sealed interior volume that is configured to hold a fluid such as air, gas, or liquid. In some cases, the actuation cell 1200 can form an elongated tube structure that is integrated with an in-bed device to extend across a width of sleeping surface such as a bed. The actuation cell 1200 can be formed from a flexible material such as silicone, polyurethane, rubber, synthetic rubber, fiber reinforced materials, composite materials, and the like. When deflated, the actuation cell 1200 can collapse on itself to form a substantially flat structure that does not contain the fluid (or contains little or less fluid). When inflated, the actuation cell 1200 can expand to form a raised structure as described herein. In the example shown in FIG. 12A, the actuation cell 1200 is sealed along its perimeter 1201 to define a closed volume. The actuation cell 1200 can be sized to extend across all or a portion of a user's torso when the user is lying on the in-bed device.

Figure 12B:
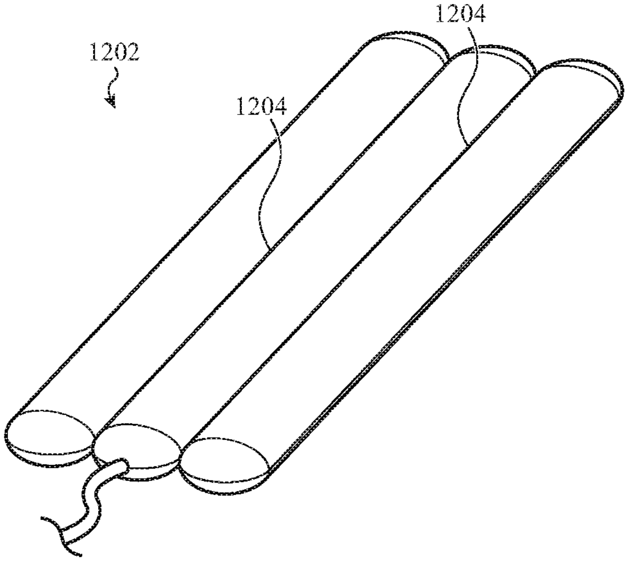

FIG. 12B shows another example of an actuation cell 1202 that can be integrated into the in-bed device as described herein. The actuation cell 1202 can include a bladder that has one or more connections 1204 to form surface features when the bladder is inflated. For example, the connections 1204 can extend along a length of the actuation cell 1202 to form multiple cylindrical features along an exterior surface of the bladder. In some cases, these cylindrical features can extend parallel to each other and parallel to a length dimension of the actuation cell 1202. When inflated, these surface features can apply a different haptic experience to a user by creating different patterns of raised and lower portions that apply varying levels of pressure to a user. FIG. 12B illustrates one example of surface features that can be created, and different portions of the actuation cell 1202 can be connected to form various different surface features when inflated. When deflated, the actuation cell 1202 can collapse on itself to form a substantially flat structure that does not contain the fluid (or contains little or less fluid). In some cases, the connections 1204 are formed by coupling a top portion of the actuation cell to a bottom portion of the actuation cell, which can be accomplished using thermal bonding techniques such as heat sealing, adhesives, mechanical couplers, or any other suitable technique.

Figure 13A:
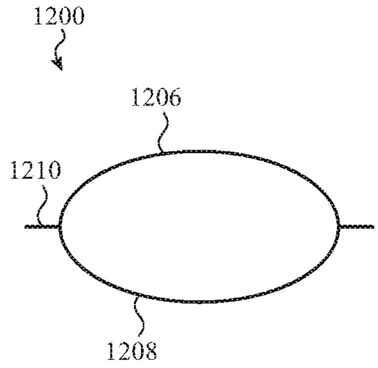
FIGS. 13A-13C illustrate cross-sectional views of example actuation cells.
Figure 13B:
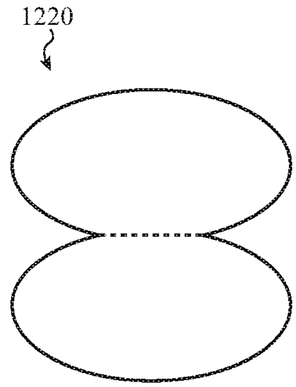
Figure 13C:
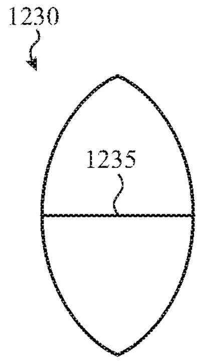

FIG. 13A shows an example cross-sectional view of an actuation cell 1200 taken along line E-E shown in FIG. 12A. As illustrated in FIG. 13A, the actuation cell 1200 can take on a circular or semi-circular configuration when inflated. The actuation cell 1200 can be formed by joining a top section 1206 with a bottom section 1208 along a seam 1210 to create a sealed internal volume. In this regard, the outer profile of the actuation cell 1200 can take on different shapes when inflated based on the shape of the top and bottom sheets 1206 and 1208, and/or the locations where the different sheets are sealed together. For example, FIG. 13B illustrates an alternative example cross-sectional view of an actuation cell 1220. The actuation cell 1220 can include multiple stacked structures, which can be used to increase an expanded height of the actuation cell 1220. The actuation cell 1220 can include multiple circular or semi-circular cross-sectional structures that are joined to form a sealed internal volume. When the actuation cell 1220 is inflated, the height of the actuation cell 1220 can be about two times the diameter of each of the cylindrical sections. FIG. 13C illustrates another example cross-sectional view of an actuation sell 1230 that can be implemented in an in-bed device. In the example of 13C, the actuation cell 1230 can include an internal structure 1235 that is used to modify the outer profile of the actuation cell 1230. For example the internal structure 1235 can couple opposite sides of the actuation cell 1230 together to limit movement between these sections as the actuation cell 1230 is inflated. In this regard, the outer profile of the actuation cell 1230 can be controlled by incorporating one or more internal structures 1235 into the actuation cell 1230. In the illustrated example, the height of the actuation cell 1230 can be increased by limiting the movement of the opposite sides away from each other. The internal structure 1235 can be a fluid permeable structure such that the actuation cell 1230 forms a single continuous volume. In other cases, the internal structure 1235 can be fluid impermeable and used to form multiple sealed volumes within the actuation cell 1230.

Figure 14A:
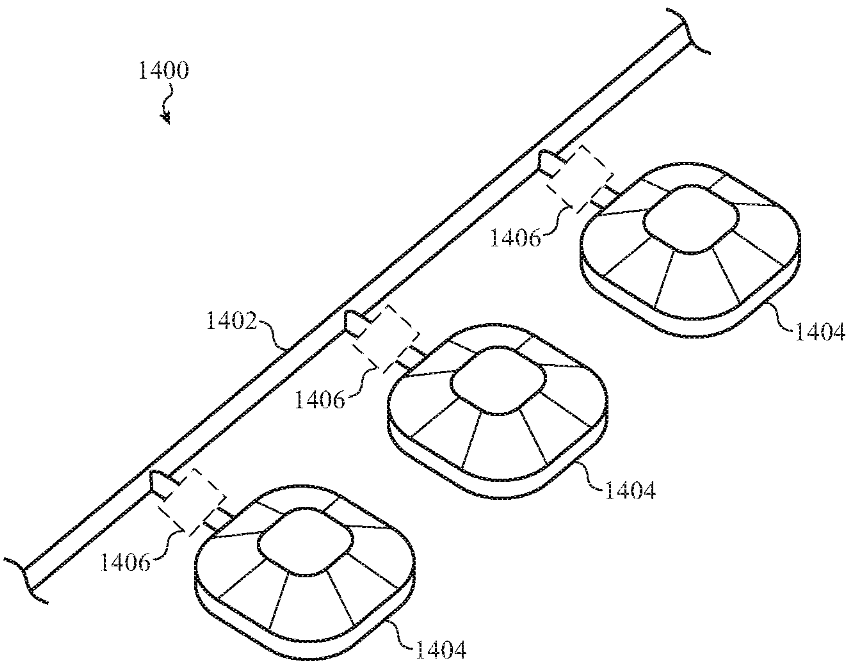
FIGS. 14A-14B illustrate example actuation cells that can be implemented in an in-bed device.

FIG. 14A shows an example of an actuation cell 1400 that can be implemented in an in-bed device as described herein. The actuation cell 1400 can include a sealed fluid passage 1402 that connects multiple inflatable bladders 1404. The positioning of the inflatable bladders 1404 within the in-bed device can be configured to create different haptic experiences for a user. For example, as illustrated in FIG. 14A, the inflatable bladders 1404 can be positioned along a first dimension that spans a width of a bed. In this regard, different ones of the bladders 1404 may be located at different positions under a user. Accordingly, when inflated or deflated the inflatable bladders 1404 can create a haptic output that is localized to specific contact regions with a user. In the example shown in FIG. 14A, the multiple bladders 1404 can be coupled to the fluid passage in a parallel configuration. In some cases, an optional valve and/or pump 1406 can be positioned between each inflatable cell 1404 and the fluid passage, which can be used to independently inflate or deflate each of the inflatable bladders. For example, the fluid passage 1402 can be selectively coupled to a high pressure and/or low pressure reservoir as described herein, and each valve 1406 can be controlled to independently inflate or deflate each bladder 1404.

In some embodiments, the actuation cell 1400 and fluid passage 1402 defines a single sealed volume that is coupled with a pump and/or reservoir via a valve. In other cases, multiple valves and/or pumps 1406 can be coupled to various location of the actuation cell 1400. For example, each inflatable bladder 1404 can include a valve 1406, which can be used to increase a deflation rate of the actuation cell 1400. In some cases, operation of the multiple valves 1406 can be coordinated by a control system to allow some of the inflatable bladders 1404 to deflate at different times and/or rates than other ones of the inflatable bladders 1404. For example, a processing unit can be configured to control the multiple valves 1406 to deflate individual bladders 1424 in a defined sequence. In this regard, distinct haptic outputs can be created based on the order or speed at which different inflatable bladders 1404 are inflated or deflated in relation to each other. In further examples, each inflatable bladder can be individually controlled, for example, using a dedicated valve that controls air flow to and from the bladder as described herein. Individually controlling inflation or deflation of the individual bladders 1404 using different valves 1406 can increase the deflation rate of the actuation cell 1400, which may produce a more pronounced or sharper haptic response for a user.

Figure 14B:
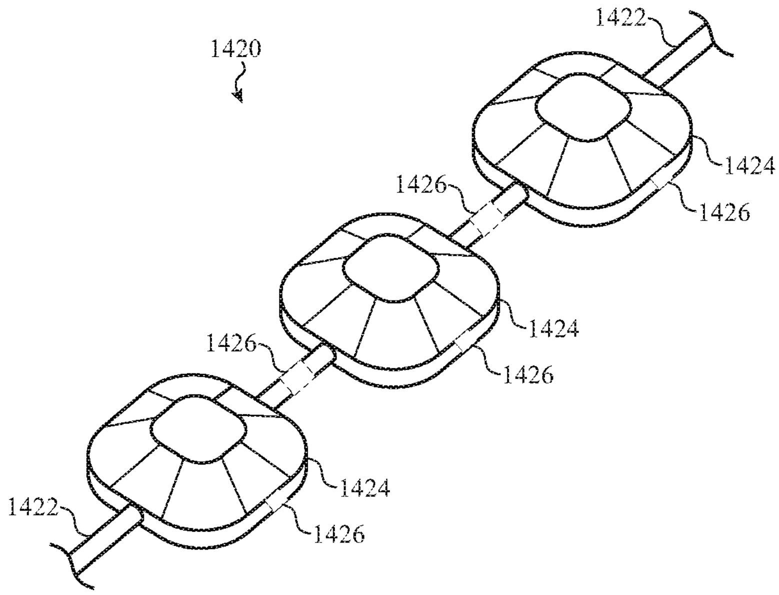

FIG. 14B shows another example of an actuation cell 1420 that can be implemented in an in-bed devices as described herein. The actuation cell 1420 can include multiple inflatable bladders 1424 that are coupled together by one or more fluid passages 1422. In the example shown in FIG. 14B the inflatable bladders 1420 can be coupled in a series configuration. In some cases, all of the inflatable bladders 1420 can form a continuous volume such that they are inflated and/or deflated in unison. In other examples, one or more valves 1426 can be coupled to individual inflatable bladders 1424 and/or between various one of the inflatable bladders 1424. In these cases, inflation and deflation of different inflatable bladders 1424 or groups of inflatable bladders 1424 can be controlled via the valves. For example, a processing unit can be configured to control the multiple valves 1426 to deflate individual bladders 1424 in a defined sequence. In this regard, different sequences of inflation or deflation can be performed to create different haptic outputs.

Figure 15:
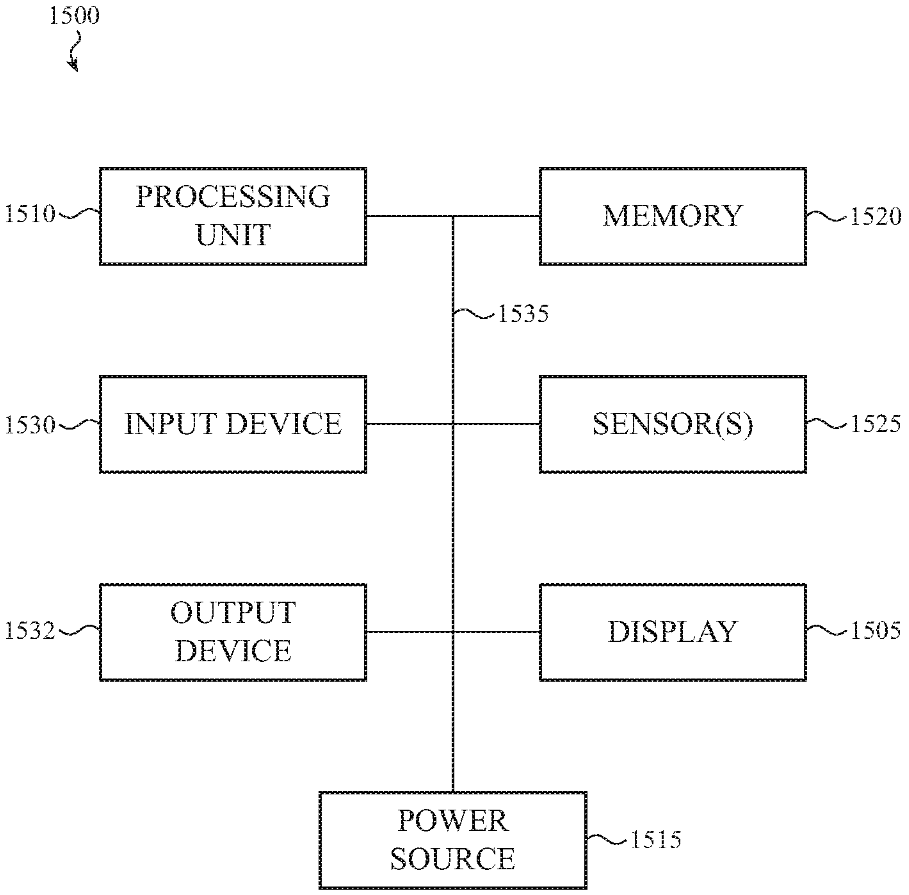
FIG. 15 shows a sample electrical block diagram of an electronic device that may incorporate and/or be connected to an in-bed haptic device.

FIG. 15 shows a sample electrical block diagram of an electronic device 1500 that may incorporate and/or be connected to an in-bed haptic device. The electronic device may in some cases take the form of any suitable electronic device, including in-bed haptic devices as described herein, sleep monitors, wearable electronic devices, timekeeping devices, health monitoring or fitness devices, portable computing devices, mobile phones (including smart phones), tablet computing devices, digital media players, virtual reality devices, audio devices (including earbuds and headphones), and the like. The electronic device 1500 can include a display 1505 (e.g., a light-emitting display), a processing unit 1510, a power source 1515, a memory 1520 or storage device, a sensor 1525, an input device 1530, and an output device 1532 (e.g., an in-bed haptic device).

The processing unit 1510 can control some or all of the operations of the electronic device 1500. The processing unit 1510 can communicate, either directly or indirectly, with some or all of the components of the electronic device 1500. For example, a system bus or other communication mechanism 1535 can provide communication between the processing unit 1510, the power source 1515, the memory 1520, the sensor 1525, and the input device(s) 1530 and the output device(s) 1532.

The processing unit 1510 can be implemented as any electronic device capable of processing, receiving, or transmitting data or instructions. For example, the processing unit 1510 can be a microprocessor, a central processing unit (CPU), an application-specific integrated circuit (ASIC), a digital signal processor (DSP), or combinations of such devices. As described herein, the term “processing unit” is meant to encompass a single processor or processing unit, multiple processors, multiple processing units, or other suitably configured computing element or elements.

It should be noted that the components of the electronic device 1500 can be controlled by multiple processing units. For example, select components of the electronic device 1500 (e.g., a sensor 1525) may be controlled by a first processing unit and other components of the electronic device 1500 (e.g., the display 1505) may be controlled by a second processing unit, where the first and second processing units may or may not be in communication with each other. In some cases, the processing unit 1510 may determine a biological parameter of a user of the electronic device, such as an ECG for the user.

The power source 1515 can be implemented with any device capable of providing energy to the electronic device 1500. For example, the power source 1515 may be one or more batteries or rechargeable batteries. Additionally or alternatively, the power source 1515 can be a power connector or power cord that connects the electronic device 1500 to another power source, such as a wall outlet.

The memory 1520 can store electronic data that can be used by the electronic device 1500. For example, the memory 1520 can store electrical data or content such as, for example, audio and video files, documents and applications, device settings and user preferences, timing signals, control signals, and data structures or databases. The memory 1520 can be configured as any type of memory. By way of example only, the memory 1520 can be implemented as random access memory, read-only memory, Flash memory, removable memory, other types of storage elements, or combinations of such devices.

The electronic device 1500 may also include one or more sensors 1525 positioned almost anywhere on the electronic device 1500. The sensor(s) 1525 can be configured to sense one or more type of parameters, such as but not limited to, pressure, light, touch, heat, movement, relative motion, biometric data (e.g., biological parameters), and so on. For example, the sensor(s) 1525 may include a heat sensor, a position sensor, a light or optical sensor, an accelerometer, a pressure transducer, a gyroscope, a magnetometer, a health monitoring sensor, and so on. Additionally, the one or more sensors 1525 can utilize any suitable sensing technology, including, but not limited to, capacitive, ultrasonic, resistive, optical, ultrasound, piezoelectric, and thermal sensing technology. In some examples, the sensors 1525 may include one or more of the contact sensors, force sensors (e.g., pressure transducers), and/or electrodes described herein (e.g., one or more electrodes in a layered sensor as described herein).

In various embodiments, the display 1505 provides a graphical output, for example associated with an operating system, user interface, and/or applications of the electronic device 1500. In one embodiment, the display 1505 includes one or more sensors and is configured as a touch-sensitive (e.g., single-touch, multi-touch) and/or force-sensitive display to receive inputs from a user. For example, the display 1505 may be integrated with a touch sensor (e.g., a capacitive touch sensor) and/or a force sensor to provide a touch- and/or force-sensitive display. The display 1505 is operably coupled to the processing unit 1510 of the electronic device 1500.

The display 1505 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1505 is positioned beneath and viewable through a cover sheet that forms at least a portion of an enclosure of the electronic device 1500.

In various embodiments, the input devices 1530 may include any suitable components for detecting inputs. Examples of input devices 1530 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1530 may be configured to detect one or more particular types of input and provide a signal (e.g., an input signal) corresponding to the detected input. The signal may be provided, for example, to the processing unit 1510.

As discussed above, in some cases, the input device(s) 1530 include a touch sensor (e.g., a capacitive touch sensor) integrated with the display 1505 to provide a touch-sensitive display. Similarly, in some cases, the input device(s) 1530 include a force sensor (e.g., a capacitive force sensor) integrated with the display 1505 to provide a force-sensitive display.

The output devices 1532 may include any suitable components for providing outputs. Examples of output devices 1532 include in-bed haptic devices discussed herein, audio output devices (e.g., speakers), visual output devices (e.g., lights or displays), tactile output devices (e.g., haptic output devices), communication devices (e.g., wired or wireless communication devices), and so on, or some combination thereof. Each output device 1532 may be configured to receive one or more signals (e.g., an output signal provided by the processing unit 1510) and provide an output corresponding to the signal.

In some cases, input devices 1530 and output devices 1532 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1510 may be operably coupled to the input devices 1530 and the output devices 1532. The processing unit 1510 may be adapted to exchange signals with the input devices 1530 and the output devices 1532. For example, the processing unit 1510 may receive an input signal from an input device 1530 that corresponds to an input detected by the input device 1530. The processing unit 1510 may interpret the received input signal to determine whether to provide and/or change one or more outputs in response to the input signal. The processing unit 1510 may then send an output signal to one or more of the output devices 1532, to provide and/or change outputs as appropriate.

As described above, one aspect of the present technology is the gathering and use of data available from various sources to provide haptic feedback, and the like. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of haptic outputs, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An in-bed haptic device, comprising:

a top layer defining a top external surface;

a bottom layer defining a bottom external surface;

an array of actuation cells positioned between the top layer and the bottom layer, each actuation cell of the array of actuation cells formed from a respective sheet coupled to the bottom layer and configured to expand upward in response to fluid being introduced into a respective actuation cell; and a channel layer positioned between the bottom layer and the array of actuation cells, the channel layer formed from a second sheet defining one or more passages configured to fluidly couple the array of actuation cells to a control system, the one or more passages each extend from an edge of the second sheet and to the respective actuation cell of the array of actuation cells; wherein:

the control system is configured to introduce pressurized air into individual cells of the array of actuation cells in a predetermined sequence to provide a haptic output.

2. The in-bed haptic device of claim 1, wherein:

the array of actuation cells is configured to locally deform the top external surface to provide the haptic output;

each actuation cell of the array of actuation cells comprises a bladder configured to inflate in response to the control system introducing the pressurized air into an interior volume of the bladder; and each bladder of the array of actuation cells is fluidly coupled to the control system by a respective passage of the one or more passages.

3. The in-bed haptic device of claim 2, wherein each actuation cell of the array of actuation cells is configured to expand in a direction that is substantially transverse to the top external surface, thereby increasing a thickness of a region of the in-bed haptic device corresponding to the actuation cell.

4. The in-bed haptic device of claim 1, wherein:

the in-bed haptic device defines a thickness between the top external surface and the bottom external surface;

the thickness of the in-bed haptic device is less than five percent of a width of the in-bed haptic device; and the thickness of the in-bed haptic device is less than five percent of a length of the in-bed haptic device.

5. The in-bed haptic device of claim 4, wherein:
the bottom layer has a first stiffness; and
the top layer has a second stiffness less than the first stiffness.

6. The in-bed haptic device of claim 1, wherein:
the array of actuation cells comprises a first actuation cell and a second actuation cell adjacent to the first actuation cell; and
providing the haptic output comprises inflating the first actuation cell while maintaining the second actuation cell in an uninflated state.

7. The in-bed haptic device of claim 1, wherein providing the haptic output comprises actuating multiple actuation cells of the array of actuation cells according to an actual randomized pattern or a simulated randomized pattern.

8. The in-bed haptic device of claim 1, wherein providing the haptic output comprises actuating multiple actuation cells of the array of actuation cells to simulate a wave moving at least partially across the top external surface of the in-bed haptic device.

9. An in-bed haptic device, comprising:
a top layer defining a top external surface;
a bottom layer defining a bottom external surface, the top layer and bottom layer defining a flexible enclosure;
a channel layer defining a top surface and a bottom surface coupled to the bottom layer, the channel layer defining a set of passages extending from an edge of the flexible enclosure;
an actuation layer coupled to the top surface of the channel layer and defining an array of actuation cells within the flexible enclosure, each actuation cell of the array of actuation cells positioned at an end of a respective passage of the set of passages; and
a control system coupled a pressurized fluid source; wherein:
the bottom layer, the channel layer and the actuation layer form a sealed fluid chamber configured to introduce pressurized fluid from the control system and to individual actuation cells of the array of actuation cells; and
the array of actuation cells is configured to locally deform the top layer of the flexible enclosure to provide a haptic output.

10. The in-bed haptic device of claim 9, wherein:
each actuation cell of the array of actuation cells comprises a bladder configured to inflate, thereby displacing a corresponding portion of the top layer to provide the haptic output at the top external surface; and
the control system is configured to introduce a fluid to the array of actuation cells to inflate one or more actuation cells of the array of actuation cells.

11. The in-bed haptic device of claim 10, wherein:
the bladder is a first bladder; and
each actuation cell of the array of actuation cells comprises a second bladder fluidly coupled to the first bladder and positioned between the first bladder and the top layer.

12. The in-bed haptic device of claim 9, wherein each passage of the set of passages define sidewalls of a respective passage of the set of passages.

13. The in-bed haptic device of claim 12, wherein:
a first element of the in-bed haptic device defines a top wall of each passage of the set of passages; and
a second element of the in-bed haptic device defines a bottom wall of each passage of the set of passages.

14. The in-bed haptic device of claim 9, wherein:
the top layer has a first stiffness; and
the bottom layer has a second stiffness greater than the first stiffness.

15. The in-bed haptic device of claim 9, further comprising an actuation component that couples the top layer to the bottom layer and allows the top layer to move relative to the bottom layer.

16. The in-bed haptic device of claim 9, wherein the in-bed haptic device is configured to be placed between a mattress and a user.

17. The in-bed haptic device of claim 9, further comprising:
a piezoelectric sensor positioned within the flexible enclosure; and
a connector that includes an electrical component coupled to the piezoelectric sensor and fluid tubing coupled to at least one passage of the set of passages.

18. A system for providing haptic outputs, comprising:
an in-bed haptic device comprising:
a top layer defining a top external surface;
a bottom layer defining a bottom external surface;
an array of actuation cells positioned between the top layer and the bottom layer, each actuation cell of the array of actuation cells configured to inflate; and
a channel layer positioned between the bottom layer and the array of actuation cells the channel layer defining a set of passages, each passage of the set of passages extending from an edge of the channel layer and to a respective actuation cell of the array of actuation cells;
a control system comprising:
a reservoir configured to contain a fluid;
a pump configured to pressurize the fluid contained in the reservoir;
a valve array configured to fluidly couple the reservoir to the the set of passages; and
a processing unit configured to control the valve array to inflate individual actuation cells of the array of actuation cells in a predetermined sequence using the pressurized fluid to provide a haptic output.

19. The system of claim 18, wherein:
the reservoir is a high pressure reservoir;
the fluid is a first fluid;
the pump is a first pump configured to increase a first pressure of the first fluid above an atmospheric pressure; and
the control system further comprises:
a vacuum reservoir configured to contain a second fluid; and
a second pump configured to decrease a second pressure of the second fluid below the atmospheric pressure.

20. The system of claim 19, wherein, for each actuation cell of the array of actuation cells:
the actuation cell is configured to be fluidly coupled to the high pressure reservoir by a first respective valve of the valve array; and
the processing unit is configured to open the first respective valve to inflate the actuation cell.

21. The system of claim 19, wherein, for each actuation cell of the array of actuation cells:
the actuation cell is configured to be fluidly coupled to the vacuum reservoir by a second respective valve of the valve array; and
the processing unit is configured to open the second respective valve to deflate the actuation cell.

* * * * *